(12) United States Patent
Hmimy et al.

(10) Patent No.: US 11,818,676 B2
(45) Date of Patent: *Nov. 14, 2023

(54) METHODS AND APPARATUS FOR DEVICE REGISTRATION IN A QUASI-LICENSED WIRELESS SYSTEM

(71) Applicant: Charter Communications Operating, LLC, St. Louis, MO (US)

(72) Inventors: Hossam Hmimy, Aurora, CO (US); Umamaheswar A. Kakinada, Carpentersville, IL (US); Lakhbir Singh, Aurora, CO (US); Akram Hassanien, Plano, TX (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 128 days.

This patent is subject to a terminal disclaimer.

(21) Appl. No.: 17/334,343

(22) Filed: May 28, 2021

(65) Prior Publication Data

US 2021/0297979 A1 Sep. 23, 2021

Related U.S. Application Data

(63) Continuation of application No. 16/661,865, filed on Oct. 23, 2019, now Pat. No. 11,026,205.

(51) Int. Cl.
*H04W 60/00* (2009.01)
*H04W 16/14* (2009.01)
(Continued)

(52) U.S. Cl.
CPC ........... *H04W 60/00* (2013.01); *H04W 12/06* (2013.01); *H04W 16/14* (2013.01); *H04W 72/23* (2023.01)

(58) Field of Classification Search
CPC ..... H04W 60/00; H04W 12/06; H04W 16/14; H04W 72/23; H04W 24/02
(Continued)

(56) References Cited

U.S. PATENT DOCUMENTS 3,999,051 A 12/1976 Petschauer
4,339,657 A 7/1982 Larson et al.
(Continued)

FOREIGN PATENT DOCUMENTS

| CA | 3114660 A1 * | 4/2020 | ....... H04L 27/26025 |
| EP | 1046259 A2 | 10/2000 | |

(Continued)

OTHER PUBLICATIONS

Palola M., et al., "Field Trial of the 3.5 GHz Citizens Broadband Radio ServiceGoverned by a Spectrum Access System (SAS)," IEEE International Symposium on Dynamic Spectrum Access Networks, 2017, 9 pages.

(Continued)

*Primary Examiner* — Mahendra R Patel
(74) *Attorney, Agent, or Firm* — Patent Beach PC

(57) ABSTRACT

Apparatus and methods for registering and authenticating a client device with a wireless-enabled network. In one embodiment, the apparatus and methods provide an alternate wireless connectivity link to register an installed high-power fixed wireless apparatus (FWA) or Customer Premises Equipment (CPE) with a managed wireless network infrastructure, such as one utilizing "quasi-licensed" CBRS (Citizens Broadband Radio Service) wireless spectrum or another shared access approach. In one variant, the alternate wireless link comprises a mobile cellular channel established via an application program executing on a mobile device. In another variant, an Internet of Thing Network (IoT) is used for the alternate link. In one implementation, (Continued)

spectrum grants are communicated back the FWA/CPE via the alternate link to enable subsequent CBRS-band high-power operation.

20 Claims, 17 Drawing Sheets

(51) Int. Cl.
  *H04W 12/06* (2021.01)
  *H04W 72/23* (2023.01)
(58) Field of Classification Search
  USPC .................................................. 455/435.1
  See application file for complete search history.

(56) References Cited

U.S. PATENT DOCUMENTS

| | | |
|---|---|---|
| 4,574,364 A | 3/1986 | Tabata et al. |
| 4,604,751 A | 8/1986 | Aichelmann, Jr. et al. |
| 4,692,757 A | 9/1987 | Tsuhara et al. |
| 4,710,761 A | 12/1987 | Kapur et al. |
| 4,845,644 A | 7/1989 | Anthias et al. |
| 4,890,098 A | 12/1989 | Dawes et al. |
| 4,890,257 A | 12/1989 | Anthias et al. |
| 5,113,517 A | 5/1992 | Beard et al. |
| 5,121,475 A | 6/1992 | Child et al. |
| 5,129,055 A | 7/1992 | Yamazaki et al. |
| 5,155,731 A | 10/1992 | Yamaguchi |
| 5,175,813 A | 12/1992 | Golding et al. |
| 5,245,615 A | 9/1993 | Treu |
| 5,276,437 A | 1/1994 | Horvath et al. |
| 5,408,602 A | 4/1995 | Giokas et al. |
| 5,463,768 A | 10/1995 | Cuddihy et al. |
| 5,487,143 A | 1/1996 | Southgate |
| 5,502,839 A | 3/1996 | Kolnick |
| 5,522,025 A | 5/1996 | Rosenstein |
| 5,564,002 A | 10/1996 | Brown |
| 5,581,686 A | 12/1996 | Koppolu et al. |
| 5,596,702 A | 1/1997 | Stucka et al. |
| 5,621,879 A | 4/1997 | Kohda |
| 5,664,046 A | 9/1997 | Abecassis |
| 5,673,403 A | 9/1997 | Brown et al. |
| 5,675,755 A | 10/1997 | Trueblood |
| 5,692,142 A | 11/1997 | Craycroft et al. |
| 5,734,380 A | 3/1998 | Adams et al. |
| 5,764,230 A | 6/1998 | Baradel et al. |
| 5,790,779 A | 8/1998 | Ben-Natan et al. |
| 5,831,609 A | 11/1998 | London et al. |
| 5,850,544 A | 12/1998 | Parvathaneny et al. |
| 5,856,826 A | 1/1999 | Craycroft |
| 5,862,316 A | 1/1999 | Hagersten et al. |
| 5,867,160 A | 2/1999 | Kraft, IV et al. |
| 5,874,960 A | 2/1999 | Mairs et al. |
| 5,877,755 A | 3/1999 | Hellhake |
| 5,895,472 A | 4/1999 | Brodsky et al. |
| 5,973,702 A | 10/1999 | Orton et al. |
| 5,991,308 A | 11/1999 | Fuhrmann et al. |
| 5,995,103 A | 11/1999 | Ashe |
| 5,995,499 A | 11/1999 | Hottinen et al. |
| 6,031,530 A | 2/2000 | Trueblood |
| 6,092,107 A | 7/2000 | Eleftheriadis et al. |
| 6,154,648 A * | 11/2000 | Comer .................. H04W 68/00 455/458 |
| 6,160,872 A | 12/2000 | Karnowski et al. |
| 6,169,725 B1 | 1/2001 | Gibbs et al. |
| 6,181,713 B1 | 1/2001 | Patki et al. |
| 6,192,403 B1 | 2/2001 | Jong et al. |
| 6,216,152 B1 | 4/2001 | Wong et al. |
| 6,219,044 B1 | 4/2001 | Ansberry et al. |
| 6,233,611 B1 | 5/2001 | Ludtke et al. |
| 6,240,555 B1 | 5/2001 | Shoff et al. |
| 6,252,889 B1 | 6/2001 | Patki et al. |
| 6,313,880 B1 | 11/2001 | Smyers et al. |
| 6,317,881 B1 | 11/2001 | Shah-Nazaroff et al. |
| 6,330,010 B1 | 12/2001 | Nason et al. |
| 6,336,122 B1 | 1/2002 | Lee et al. |
| 6,337,717 B1 | 1/2002 | Nason et al. |
| 6,356,560 B1 | 3/2002 | Venters et al. |
| 6,366,876 B1 | 4/2002 | Looney |
| 6,381,710 B1 | 4/2002 | Kim |
| 6,381,735 B1 | 4/2002 | Hunt |
| 6,397,262 B1 | 5/2002 | Hayden et al. |
| 6,430,570 B1 | 8/2002 | Judge et al. |
| 6,456,892 B1 | 9/2002 | Dara-Abrams et al. |
| 6,460,141 B1 | 10/2002 | Olden |
| 6,469,742 B1 | 10/2002 | Trovato et al. |
| 6,496,864 B1 | 12/2002 | McCartney |
| 6,505,298 B1 | 1/2003 | Cerbini et al. |
| 6,510,152 B1 | 1/2003 | Gerszberg et al. |
| 6,529,965 B1 | 3/2003 | Thomsen et al. |
| 6,532,552 B1 | 3/2003 | Benignus et al. |
| 6,542,500 B1 | 4/2003 | Gerszberg et al. |
| 6,546,016 B1 | 4/2003 | Gerszberg et al. |
| 6,546,419 B1 | 4/2003 | Humpleman et al. |
| 6,600,958 B1 | 7/2003 | Zondag |
| 6,606,711 B2 | 8/2003 | Andrews et al. |
| 6,625,274 B1 | 9/2003 | Hoffpauir et al. |
| 6,630,943 B1 | 10/2003 | Nason et al. |
| 6,631,350 B1 | 10/2003 | Celi, Jr. et al. |
| 6,631,403 B1 | 10/2003 | Deutsch et al. |
| 6,651,248 B1 | 11/2003 | Alpern |
| 6,654,722 B1 | 11/2003 | Aldous et al. |
| 6,687,735 B1 | 2/2004 | Logston et al. |
| 6,714,534 B1 | 3/2004 | Gerszberg et al. |
| 6,750,879 B2 | 6/2004 | Sandberg |
| 6,762,796 B1 | 7/2004 | Nakajoh et al. |
| 6,762,798 B1 | 7/2004 | Messer et al. |
| 6,771,953 B1 | 8/2004 | Chow et al. |
| 6,782,262 B1 | 8/2004 | Lundborg |
| 6,802,056 B1 | 10/2004 | Chaiken et al. |
| 6,847,649 B2 | 1/2005 | Sutanto |
| 6,850,533 B2 | 2/2005 | Gerszberg et al. |
| 6,856,330 B1 | 2/2005 | Chew et al. |
| 6,873,877 B1 | 3/2005 | Tobias et al. |
| 6,895,573 B2 | 5/2005 | Norgaard et al. |
| 6,938,254 B1 | 8/2005 | Mathur et al. |
| 6,941,341 B2 | 9/2005 | Logston et al. |
| 6,944,185 B2 | 9/2005 | Patki et al. |
| 6,948,175 B1 | 9/2005 | Fong et al. |
| 6,948,183 B1 | 9/2005 | Peterka |
| 6,952,836 B1 | 10/2005 | Donlan et al. |
| 6,968,364 B1 | 11/2005 | Wong et al. |
| 6,973,050 B2 | 12/2005 | Birdwell et al. |
| 6,996,808 B1 | 2/2006 | Niewiadomski et al. |
| 7,010,796 B1 | 3/2006 | Strom et al. |
| 7,039,633 B1 | 5/2006 | Dey et al. |
| 7,055,146 B1 | 5/2006 | Durr et al. |
| 7,058,964 B2 | 6/2006 | Khandelwal et al. |
| 7,068,597 B1 | 6/2006 | Fijolek et al. |
| 7,080,356 B2 | 7/2006 | Atallah et al. |
| 7,096,459 B2 | 8/2006 | Keller et al. |
| 7,111,072 B1 | 9/2006 | Matthews et al. |
| 7,137,106 B2 | 11/2006 | Herman et al. |
| 7,146,305 B2 | 12/2006 | Made et al. |
| 7,158,993 B1 | 1/2007 | Schwabe |
| 7,181,725 B1 | 2/2007 | Posegga et al. |
| 7,194,249 B2 | 3/2007 | Phillips et al. |
| 7,203,869 B2 | 4/2007 | Gwak |
| 7,213,213 B2 | 5/2007 | Sekiguchi et al. |
| 7,216,170 B2 | 5/2007 | Ludvig et al. |
| 7,240,104 B2 | 7/2007 | Gautney |
| 7,266,726 B1 | 9/2007 | Ladd et al. |
| 7,290,253 B1 | 10/2007 | Agesen |
| 7,316,003 B1 | 1/2008 | Dulepet et al. |
| 7,328,333 B2 | 2/2008 | Kawano et al. |
| 7,370,322 B1 | 5/2008 | Matena et al. |
| 7,394,473 B2 | 7/2008 | Asai |
| 7,401,324 B1 | 7/2008 | Dmitriev |
| 7,478,341 B2 | 1/2009 | Dove |
| 7,487,534 B1 | 2/2009 | Peterka et al. |
| 7,546,602 B2 | 6/2009 | Hejlsberg et al. |
| 7,552,450 B1 | 6/2009 | Evans et al. |
| 7,698,606 B2 | 4/2010 | Ladd et al. |

(56) References Cited

U.S. PATENT DOCUMENTS

| | | |
|---|---|---|
| 7,814,544 B1 | 10/2010 | Wilhelm |
| 7,945,902 B1 | 5/2011 | Sahoo |
| 8,024,607 B2 | 9/2011 | Ladd et al. |
| 8,042,113 B2 | 10/2011 | Clohessy et al. |
| 8,046,636 B2 | 10/2011 | Ladd et al. |
| 8,189,465 B1 | 5/2012 | Pawar et al. |
| 8,302,111 B2 | 10/2012 | Ladd et al. |
| 8,321,723 B2 | 11/2012 | Ladd et al. |
| 8,799,723 B2 | 8/2014 | Ladd et al. |
| 8,997,136 B2 | 3/2015 | Brooks et al. |
| 9,166,891 B2 | 10/2015 | Hu et al. |
| 9,258,809 B2 | 2/2016 | Liao et al. |
| 9,386,496 B2 | 7/2016 | Gupta et al. |
| 9,413,651 B2 | 8/2016 | Tsym et al. |
| 9,526,056 B2 | 12/2016 | Tomici et al. |
| 9,564,932 B1 | 2/2017 | Pack et al. |
| 9,591,491 B2 | 3/2017 | Tapia et al. |
| 9,612,816 B2 | 4/2017 | Choi et al. |
| 9,654,149 B2 | 5/2017 | Piipponen et al. |
| 9,699,663 B1 * | 7/2017 | Jovancevic ............ G01S 7/021 |
| 9,730,135 B1 | 8/2017 | Rahman |
| 9,730,143 B2 | 8/2017 | Gormley et al. |
| 9,769,692 B2 | 9/2017 | Freda et al. |
| 9,807,778 B2 | 10/2017 | Ma et al. |
| 9,813,148 B2 | 11/2017 | Syed et al. |
| 9,887,864 B1 | 2/2018 | Han et al. |
| 10,033,505 B2 * | 7/2018 | Malladi ............... H04L 5/0057 |
| 10,098,568 B2 | 10/2018 | Gazdzinski |
| 10,135,730 B2 | 11/2018 | Chou |
| 10,149,327 B2 * | 12/2018 | Au .................... H04W 74/0841 |
| 10,340,976 B2 | 7/2019 | Kakinada et al. |
| 10,405,192 B2 | 9/2019 | Kakinada et al. |
| 10,484,876 B2 | 11/2019 | Shah et al. |
| 10,492,204 B2 | 11/2019 | Kakinada et al. |
| 10,498,611 B1 | 12/2019 | Kloberdans et al. |
| 10,499,409 B2 | 12/2019 | Shattil |
| 10,506,456 B2 | 12/2019 | Lou et al. |
| 10,531,309 B1 | 1/2020 | Li et al. |
| 10,536,858 B2 * | 1/2020 | Zapanta ................ H04W 24/10 |
| 10,536,859 B2 | 1/2020 | Gunasekara et al. |
| 10,680,883 B2 | 6/2020 | Hall et al. |
| 10,805,562 B2 | 10/2020 | Nakamura et al. |
| 11,026,205 B2 | 6/2021 | Hmimy et al. |
| 11,190,861 B2 | 11/2021 | Bali |
| 11,219,026 B2 | 1/2022 | Kakinada et al. |
| 11,564,249 B2 * | 1/2023 | Talarico ............... H04L 1/1607 |
| 2001/0007138 A1 | 7/2001 | Iida et al. |
| 2001/0049691 A1 | 12/2001 | Asazu |
| 2002/0009149 A1 | 1/2002 | Rodriguez et al. |
| 2002/0032754 A1 | 3/2002 | Logston et al. |
| 2002/0034193 A1 | 3/2002 | Patki et al. |
| 2002/0038358 A1 | 3/2002 | Sweatt, III et al. |
| 2002/0040470 A1 | 4/2002 | Guthrie et al. |
| 2002/0044567 A1 | 4/2002 | Voit et al. |
| 2002/0044569 A1 | 4/2002 | Kwok et al. |
| 2002/0049978 A1 | 4/2002 | Rodriguez et al. |
| 2002/0052977 A1 | 5/2002 | Stall |
| 2002/0073244 A1 | 6/2002 | Davies et al. |
| 2002/0080038 A1 | 6/2002 | Smith |
| 2002/0083214 A1 | 6/2002 | Heisig et al. |
| 2002/0112090 A1 | 8/2002 | Bennett et al. |
| 2002/0122040 A1 | 9/2002 | Noyle |
| 2002/0126144 A1 | 9/2002 | Chenede |
| 2002/0126748 A1 | 9/2002 | Rafie et al. |
| 2002/0144193 A1 | 10/2002 | Hicks et al. |
| 2002/0170033 A1 | 11/2002 | Chen |
| 2002/0174430 A1 | 11/2002 | Ellis et al. |
| 2002/0174433 A1 | 11/2002 | Baumgartner et al. |
| 2002/0191028 A1 | 12/2002 | Senechalle et al. |
| 2002/0198868 A1 | 12/2002 | Kinzhalin et al. |
| 2003/0005454 A1 | 1/2003 | Rodriguez et al. |
| 2003/0009765 A1 | 1/2003 | Linden et al. |
| 2003/0009769 A1 | 1/2003 | Hensgen et al. |
| 2003/0037331 A1 | 2/2003 | Lee |
| 2003/0041291 A1 | 2/2003 | Hashem et al. |
| 2003/0056155 A1 | 3/2003 | Austen et al. |
| 2003/0056217 A1 | 3/2003 | Brooks |
| 2003/0061240 A1 | 3/2003 | McCann et al. |
| 2003/0081664 A1 | 5/2003 | Lu et al. |
| 2003/0105995 A1 | 6/2003 | Schroath et al. |
| 2003/0107604 A1 | 6/2003 | Ording |
| 2003/0110331 A1 | 6/2003 | Kawano et al. |
| 2003/0110511 A1 | 6/2003 | Schutte et al. |
| 2003/0121055 A1 | 6/2003 | Kaminski et al. |
| 2003/0122879 A1 | 7/2003 | Inui et al. |
| 2003/0140285 A1 | 7/2003 | Wilkie |
| 2003/0158906 A1 | 8/2003 | Hayes |
| 2003/0163811 A1 | 8/2003 | Luehrs |
| 2003/0181241 A1 | 9/2003 | Oakes et al. |
| 2003/0188320 A1 | 10/2003 | Shing |
| 2003/0204848 A1 | 10/2003 | Cheng et al. |
| 2003/0217197 A1 | 11/2003 | Chan et al. |
| 2003/0217365 A1 | 11/2003 | Caputo |
| 2003/0229899 A1 | 12/2003 | Thompson et al. |
| 2003/0229900 A1 | 12/2003 | Reisman |
| 2003/0231855 A1 | 12/2003 | Gates et al. |
| 2004/0001021 A1 | 1/2004 | Choo et al. |
| 2004/0003400 A1 | 1/2004 | Carney et al. |
| 2004/0034697 A1 | 2/2004 | Fairhurst et al. |
| 2004/0040041 A1 | 2/2004 | Crawford |
| 2004/0073944 A1 | 4/2004 | Booth |
| 2004/0078695 A1 | 4/2004 | Bowers et al. |
| 2004/0078829 A1 | 4/2004 | Patel et al. |
| 2004/0083464 A1 | 4/2004 | Cwalina et al. |
| 2004/0098730 A1 | 5/2004 | Foote et al. |
| 2004/0103434 A1 | 5/2004 | Ellis |
| 2004/0107451 A1 | 6/2004 | Khandelwal et al. |
| 2004/0143836 A1 | 7/2004 | McCormack et al. |
| 2004/0158829 A1 | 8/2004 | Beresin et al. |
| 2004/0181811 A1 | 9/2004 | Rakib |
| 2004/0186603 A1 | 9/2004 | Sanford et al. |
| 2004/0187150 A1 | 9/2004 | Gonder et al. |
| 2004/0187152 A1 | 9/2004 | Francis et al. |
| 2004/0196834 A1 | 10/2004 | Ofek et al. |
| 2004/0199903 A1 | 10/2004 | Iizuka |
| 2004/0205339 A1 | 10/2004 | Medin |
| 2004/0218736 A1 | 11/2004 | Fang et al. |
| 2004/0230754 A1 | 11/2004 | Gumm et al. |
| 2004/0236759 A1 | 11/2004 | Young |
| 2004/0261092 A1 | 12/2004 | Addington et al. |
| 2004/0261114 A1 | 12/2004 | Addington et al. |
| 2004/0261116 A1 | 12/2004 | McKeown et al. |
| 2004/0261126 A1 | 12/2004 | Addington et al. |
| 2005/0015799 A1 | 1/2005 | Park |
| 2005/0021766 A1 | 1/2005 | McKeowen et al. |
| 2005/0027851 A1 | 2/2005 | McKeown et al. |
| 2005/0071818 A1 | 3/2005 | Reissman et al. |
| 2005/0114900 A1 | 5/2005 | Ladd et al. |
| 2005/0120385 A1 | 6/2005 | Stalker |
| 2005/0132346 A1 | 6/2005 | Tsantilis |
| 2005/0160045 A1 | 7/2005 | Watanabe et al. |
| 2005/0162267 A1 | 7/2005 | Khandelwal et al. |
| 2005/0177832 A1 | 8/2005 | Chew |
| 2005/0273762 A1 | 12/2005 | Lesh |
| 2006/0005183 A1 | 1/2006 | Minear et al. |
| 2006/0020950 A1 | 1/2006 | Ladd et al. |
| 2006/0036750 A1 | 2/2006 | Ladd et al. |
| 2006/0047957 A1 | 3/2006 | Helms et al. |
| 2006/0070051 A1 | 3/2006 | Kuck et al. |
| 2006/0129947 A1 | 6/2006 | Hamzy et al. |
| 2006/0130107 A1 | 6/2006 | Gonder et al. |
| 2006/0130113 A1 | 6/2006 | Carlucci et al. |
| 2006/0143492 A1 | 6/2006 | Leduc et al. |
| 2006/0161946 A1 | 7/2006 | Shin |
| 2006/0188004 A1 | 8/2006 | Kizu et al. |
| 2007/0094345 A1 | 4/2007 | Rabbers et al. |
| 2007/0207771 A1 | 9/2007 | Bowser et al. |
| 2007/0217436 A1 | 9/2007 | Markley et al. |
| 2007/0261090 A1 | 11/2007 | Miller et al. |
| 2007/0288897 A1 | 12/2007 | Branda et al. |
| 2007/0294673 A1 | 12/2007 | Guerrera et al. |
| 2008/0010506 A1 | 1/2008 | Tabei et al. |
| 2008/0097913 A1 | 4/2008 | Dicks et al. |
| 2008/0098212 A1 | 4/2008 | Helms et al. |

(56) References Cited

U.S. PATENT DOCUMENTS

| | | |
|---|---|---|
| 2008/0126540 A1 | 5/2008 | Zeng et al. |
| 2008/0178153 A1 | 7/2008 | Fox et al. |
| 2008/0196011 A1 | 8/2008 | Bhandari et al. |
| 2008/0220786 A1 | 9/2008 | Beacham |
| 2008/0220788 A1 | 9/2008 | Stanwood et al. |
| 2008/0256510 A1 | 10/2008 | Auerbach |
| 2008/0288930 A1 | 11/2008 | Chen et al. |
| 2009/0034443 A1 | 2/2009 | Walker et al. |
| 2009/0129273 A1 | 5/2009 | Zou |
| 2009/0222867 A1 | 9/2009 | Munetsugu |
| 2009/0253438 A1 | 10/2009 | Chater-Lea et al. |
| 2009/0323516 A1 | 12/2009 | Bhagwan et al. |
| 2010/0035610 A1 | 2/2010 | Narang et al. |
| 2010/0094956 A1 | 4/2010 | Zuckerman et al. |
| 2010/0128608 A1 | 5/2010 | Zou et al. |
| 2010/0234042 A1 | 9/2010 | Chan et al. |
| 2010/0262722 A1 | 10/2010 | Vauthier et al. |
| 2010/0309806 A1 | 12/2010 | Wu et al. |
| 2011/0014924 A1 | 1/2011 | Hwang et al. |
| 2011/0124335 A1 | 5/2011 | Martin et al. |
| 2011/0292970 A1 | 12/2011 | Lansford et al. |
| 2011/0314462 A1 | 12/2011 | Clark et al. |
| 2013/0007413 A1 | 1/2013 | Thomson et al. |
| 2013/0109323 A1 | 5/2013 | Ruutu et al. |
| 2013/0122903 A1 | 5/2013 | Farnsworth et al. |
| 2013/0201316 A1 | 8/2013 | Binder et al. |
| 2013/0247027 A1 | 9/2013 | Shah et al. |
| 2013/0281092 A1 | 10/2013 | Gassend |
| 2013/0288675 A1 | 10/2013 | Gassend |
| 2013/0303145 A1 | 11/2013 | Harrang et al. |
| 2013/0315124 A1 | 11/2013 | Rapaport et al. |
| 2013/0336175 A1 | 12/2013 | Um et al. |
| 2014/0035182 A1 | 2/2014 | Boyer et al. |
| 2014/0106672 A1* | 4/2014 | Jeon ............... H04B 5/0031 455/41.1 |
| 2014/0194068 A1 | 7/2014 | Coppage et al. |
| 2014/0241187 A1 | 8/2014 | Barkay et al. |
| 2014/0269526 A1 | 9/2014 | Mitola, III |
| 2014/0282704 A1 | 9/2014 | Tumuluru et al. |
| 2014/0282802 A1 | 9/2014 | Bowler et al. |
| 2014/0308986 A1 | 10/2014 | Yang et al. |
| 2014/0354442 A1 | 12/2014 | Maity et al. |
| 2015/0049834 A1 | 2/2015 | Fuhrmann et al. |
| 2015/0052512 A1 | 2/2015 | Kostadinov et al. |
| 2015/0055623 A1 | 2/2015 | Li et al. |
| 2015/0058861 A1 | 2/2015 | Zheng et al. |
| 2015/0071239 A1 | 3/2015 | Zhang et al. |
| 2015/0134970 A1 | 5/2015 | Jang et al. |
| 2015/0139175 A1* | 5/2015 | Ratasuk ............ H04L 5/0007 370/330 |
| 2015/0156095 A1 | 6/2015 | Lu |
| 2015/0181589 A1* | 6/2015 | Luo ............... H04L 5/0048 370/329 |
| 2015/0208262 A1 | 7/2015 | Siomina |
| 2015/0280847 A1 | 10/2015 | Somasundaram et al. |
| 2015/0334664 A1 | 11/2015 | Sawai et al. |
| 2015/0341753 A1 | 11/2015 | Chen et al. |
| 2015/0373741 A1 | 12/2015 | Yerramalli et al. |
| 2016/0007138 A1 | 1/2016 | Palanisamy et al. |
| 2016/0007147 A1 | 1/2016 | Zhang et al. |
| 2016/0021661 A1* | 1/2016 | Yerramalli ......... H04W 16/14 370/329 |
| 2016/0073259 A1* | 3/2016 | Lee ............... G06F 3/04847 709/225 |
| 2016/0127185 A1 | 5/2016 | McAllister |
| 2016/0128001 A1 | 5/2016 | Tsuda |
| 2016/0165066 A1 | 6/2016 | Yang et al. |
| 2016/0182134 A1 | 6/2016 | Kol et al. |
| 2016/0212031 A1 | 7/2016 | Jain et al. |
| 2016/0234746 A1 | 8/2016 | Gopal et al. |
| 2016/0330743 A1 | 11/2016 | Das et al. |
| 2016/0381600 A1 | 12/2016 | Aksu |
| 2017/0013479 A1* | 1/2017 | Sun ............... H04W 24/08 |
| 2017/0026203 A1 | 1/2017 | Thomas et al. |
| 2017/0094527 A1 | 3/2017 | Shattil et al. |
| 2017/0111846 A1 | 4/2017 | Kang |
| 2017/0149937 A1 | 5/2017 | Ren et al. |
| 2017/0155703 A1 | 6/2017 | Hao et al. |
| 2017/0164326 A1 | 6/2017 | Worrall |
| 2017/0188241 A1* | 6/2017 | Mueck ............. H04W 16/14 |
| 2017/0208540 A1 | 7/2017 | Egner et al. |
| 2017/0237767 A1 | 8/2017 | George et al. |
| 2017/0257750 A1 | 9/2017 | Gunasekara et al. |
| 2017/0272955 A1* | 9/2017 | Sadek ............. H04L 1/0001 |
| 2017/0295497 A1 | 10/2017 | MacMullan et al. |
| 2017/0295578 A1 | 10/2017 | Khoshnevisan et al. |
| 2017/0303138 A1 | 10/2017 | Barmettler et al. |
| 2017/0311290 A1 | 10/2017 | Adjakple et al. |
| 2017/0316233 A1 | 11/2017 | Kherani et al. |
| 2017/0318472 A1 | 11/2017 | Yu et al. |
| 2017/0359731 A1 | 12/2017 | Soldati et al. |
| 2018/0007587 A1 | 1/2018 | Feldman et al. |
| 2018/0049036 A1 | 2/2018 | Sethi et al. |
| 2018/0063736 A1 | 3/2018 | Sadeghi et al. |
| 2018/0063758 A1 | 3/2018 | Velu |
| 2018/0115903 A1 | 4/2018 | Badic et al. |
| 2018/0124613 A1 | 5/2018 | Kang et al. |
| 2018/0132112 A1 | 5/2018 | Khoshnevisan et al. |
| 2018/0146058 A1 | 5/2018 | Somayazulu et al. |
| 2018/0146408 A1 | 5/2018 | Meylan et al. |
| 2018/0167948 A1 | 6/2018 | Egner et al. |
| 2018/0199214 A1 | 7/2018 | Shen |
| 2018/0234403 A1 | 8/2018 | Casella et al. |
| 2018/0235007 A1 | 8/2018 | Gou et al. |
| 2018/0242184 A1 | 8/2018 | Yerramalli et al. |
| 2018/0255575 A1 | 9/2018 | Yu et al. |
| 2018/0255576 A1 | 9/2018 | Bhorkar et al. |
| 2018/0279212 A1 | 9/2018 | Malik et al. |
| 2018/0316563 A1 | 11/2018 | Kumar et al. |
| 2018/0323938 A1 | 11/2018 | Takeda et al. |
| 2018/0351665 A1 | 12/2018 | Fukuta et al. |
| 2018/0352386 A1 | 12/2018 | Gunasekara et al. |
| 2018/0375887 A1 | 12/2018 | Dezent et al. |
| 2019/0021012 A1 | 1/2019 | Beck et al. |
| 2019/0028182 A1 | 1/2019 | Smyth et al. |
| 2019/0037480 A1 | 1/2019 | Sun et al. |
| 2019/0044614 A1 | 2/2019 | Khoshnevisan et al. |
| 2019/0081690 A1 | 3/2019 | Mueck et al. |
| 2019/0082447 A1 | 3/2019 | Harsha et al. |
| 2019/0098510 A1 | 3/2019 | Guo et al. |
| 2019/0098632 A1 | 3/2019 | Martin et al. |
| 2019/0104551 A1 | 4/2019 | Deenoo et al. |
| 2019/0115950 A1 | 4/2019 | Kakinada et al. |
| 2019/0150182 A1 | 5/2019 | Koorapaty et al. |
| 2019/0167948 A1 | 6/2019 | Klocke et al. |
| 2019/0182895 A1 | 6/2019 | Di Girolamo et al. |
| 2019/0222266 A1 | 7/2019 | Cui et al. |
| 2019/0230613 A1* | 7/2019 | Kim ............... H04W 8/005 |
| 2019/0239190 A1 | 8/2019 | Patel et al. |
| 2019/0296789 A1 | 9/2019 | Yu et al. |
| 2019/0319814 A1 | 10/2019 | Das |
| 2019/0320490 A1 | 10/2019 | Liu et al. |
| 2019/0349848 A1 | 11/2019 | Bali |
| 2019/0364565 A1 | 11/2019 | Hmimy et al. |
| 2019/0373615 A1 | 12/2019 | Cimpu et al. |
| 2019/0387515 A1* | 12/2019 | Stauffer ............ H04L 5/0044 |
| 2019/0393926 A1 | 12/2019 | Kakinada et al. |
| 2019/0394790 A1* | 12/2019 | Damnjanovic ..... H04L 27/0006 |
| 2019/0394791 A1* | 12/2019 | Brueck ............. H04W 74/0891 |
| 2020/0021689 A1 | 1/2020 | Sultana et al. |
| 2020/0025629 A1 | 1/2020 | Zinger et al. |
| 2020/0053545 A1 | 2/2020 | Wong et al. |
| 2020/0059795 A1 | 2/2020 | Kakinada et al. |
| 2020/0083892 A1 | 3/2020 | Kundu et al. |
| 2020/0084759 A1 | 3/2020 | Liu et al. |
| 2020/0146058 A1 | 5/2020 | Xu et al. |
| 2020/0187150 A1 | 6/2020 | Eisner |
| 2020/0221392 A1 | 7/2020 | Xue et al. |
| 2020/0228993 A1 | 7/2020 | Gunasekara |
| 2020/0252933 A1 | 8/2020 | Hmimy et al. |
| 2020/0275457 A1 | 8/2020 | Hmimy |
| 2020/0344515 A1 | 10/2020 | Wong et al. |
| 2021/0014693 A1 | 1/2021 | Syed et al. |

(56) References Cited

U.S. PATENT DOCUMENTS

| | | | |
|---|---|---|---|
| 2021/0026711 | A1 | 1/2021 | Ovadia et al. |
| 2021/0051653 | A1 | 2/2021 | Park et al. |
| 2021/0076424 | A1 | 3/2021 | Mukherjee et al. |
| 2021/0105633 | A1 | 4/2021 | Vaidya et al. |
| 2021/0126662 | A1 | 4/2021 | Solichien |
| 2021/0127423 | A1 | 4/2021 | Park et al. |
| 2021/0136838 | A1 | 5/2021 | Khalid et al. |
| 2021/0204322 | A1 | 7/2021 | Lou et al. |
| 2021/0219143 | A1 | 7/2021 | Khalid et al. |
| 2021/0219303 | A1 | 7/2021 | Khalid et al. |
| 2021/0227396 | A1 | 7/2021 | Khalid et al. |
| 2021/0235495 | A1 | 7/2021 | Xu et al. |
| 2021/0266914 | A1 | 8/2021 | Yoo et al. |
| 2021/0274499 | A1 | 9/2021 | Hmimy et al. |
| 2021/0274506 | A1 | 9/2021 | Raghavan et al. |
| 2021/0376905 | A1 | 12/2021 | Zhou et al. |
| 2022/0007200 | A1 | 1/2022 | Sevindik et al. |
| 2022/0007374 | A1 | 1/2022 | Sevindik et al. |
| 2022/0078804 | A1 | 3/2022 | Hmimy |
| 2022/0167176 | A1 | 5/2022 | Khalid |
| 2022/0183093 | A1 | 6/2022 | Sevindik et al. |
| 2022/0191675 | A1 | 6/2022 | Mukherjee |

FOREIGN PATENT DOCUMENTS

| | | | | |
|---|---|---|---|---|
| EP | 2294860 | B1 | 4/2017 | |
| EP | 3741168 | A1 | 11/2020 | |
| EP | 3797546 | A1 | 3/2021 | |
| EP | 3360382 | B1 * | 7/2021 | ............ H04L 5/001 |
| GB | 2585394 | A | 1/2021 | |
| JP | 2021510973 | A | 4/2021 | |
| WO | WO-0024192 | A1 | 4/2000 | |
| WO | WO-0213039 | A1 | 2/2002 | |
| WO | WO-2013020599 | A1 | 2/2013 | |
| WO | WO-2017130494 | A1 | 8/2017 | |
| WO | WO-2017186294 | | 11/2017 | |
| WO | WO-2018144976 | A2 * | 8/2018 | ........... H04L 1/0026 |
| WO | WO-2019140461 | A1 | 7/2019 | |
| WO | WO-2019199784 | A3 * | 11/2019 | |
| WO | WO-2019226838 | A1 | 11/2019 | |
| WO | WO-2020160403 | A1 | 8/2020 | |
| WO | WO-2021050957 | A1 | 3/2021 | |
| WO | WO-2021067810 | A1 | 4/2021 | |
| WO | WO-2021086986 | A1 | 5/2021 | |

OTHER PUBLICATIONS

Souryal, Michael R., et al., "Effect of Federal Incumbent Activity on CBRS Commercialservice", International Symposium on Dynamic Spectrum Access Networks (DySPAN), IEEE2019, 5 pages.

3GPP, "Technical Specification—3rd Generation Partnership Project, Technical Specification Group Services and System Aspects, Telecommunication Management, Charging management, Proximity-based services (ProSe) charging (Release 14)," TS 32.277, V14.0.0, Sep. 2016, 91 pages.

3GPP TS 36.413 V14.4. entitled "3rd Generation Partnership Project; Technical Specification Group Radio Access Network; Evolved Universal Terrestrial Radio Access Network (E-UTRAN); S1 Application Protocol (S1AP) (Release 14)" dated Sep. 2017.

3GPP TS 38.889 3rd Generation Partnership Project; Technical Specification Group Radio Access Network; Study on NR-based Access to Unlicensed Spectrum; Release 16, (Nov. 2018), 120 pages.

Allen, et al., The Case for Run-Time Types in Generic Java, Rice University 2002 pp. 1-6.

Banerji S., et al., "On IEEE 802.11: Wireless LAN Technology," 2013, vol. 3(4), 19 pages.

Chapter 4—Window Manager for Mac © . Apple Computer. Inc., Jul. 11, 1996, 4 pages.

Chapter 7—Window Management, SOL library Documentation vU.3-rev 1, Sep. 2001, 2 pages.

Chou, et al.,Open CPE Architecture: A Solution to the Delivery of Integrated Services over Broadband, Intel Communication Group, Corp. pp. 1-10, 2001.

Curran K., et al., "The Use of Dynamically Reconfigurable Protocol Stacks for Streaming Multimedia to Mobile Devices," 8th IEEE International Conference on Communication Systems Singapore, Nov. 25-28, 2002, pp. 947-951. URL: http://www.infm.ulst.ac.uk/.about.kevin/pubs.htm.

Day, "Java Media Framework Player API", Apr. 1997, XP-002093309, www.javaworld.com.

Deering, S., et al., "Internet Protocol, Version 6 (IPv6) Specification," Internet Engineering Task Force (IETF) RFC 2460, Dec. 1998, 39 pages.

Eldering, Charles, Customer Permises Epuipment Residential Broadband Networks, Jun. 1997, IEEE, p. 114-212.

Ellis, "Getting to Know the OpenCable Application Platform," Sun microsystems, Jun. 2006.

Evain, "The Multimedia Home Platform" EBU Review—Technical, European Broadcasting Union. Brussels, BE, No. 275, Mar. 21, 1998, pp. 4-10, XP000767493.

"Fact Sheet Unlicensed Use of the 6 GHz Band Notice of Proposed Rulemaking" dated Oct. 2, 2018 (available at https://docs.fcc.gov/public/attachments/DOC-354364A1.pdf).

Han R., et al., Websplitter, 2000, pp. 13.

Hentschel et al., Video Quality Of Service for Consumer Terminal A Novel System for Programmable Componets, 2002, IEEE, pp. 28-29.

Hutchings D. R., et al., New Operation for Display Space Management and Window Management, Technical Report GIT-GVU-02-18, Aug. 2002, 20 pages.

IEEE 802.11 standard, 1997, URL: http://www.ieeexplore.ieee.org/documenU654779.

"Internet Protocol DARPA Internet Program Protocol Specification", IETF RCF 791 (Sep. 1981).

"Internet Protocol, DARPA Internet Program, Protocol Specification", IETF RCF 791, Sep. 1981, 50 pages.

Java Media Players, V.1.0.5, May 5, 1998, X940410443, Sun Microsystems, Inc.

"JMFRegistry User's Guide", Sun Microsystems, XP-002573305, Mar. 8, 2010.

Kadir E.A., et al., "Performance Analysis of Wireless LAN 802.11 Standard for e-Learning", 2016 International Conference on Information and Communication Technology, 6 pages.

Kar, et al., Cable's Home Digital Network Interface of Choice, 1999, Cable Television Lab. IEEE, pp. 34-35.

Luu J, "MainWin and Window Managers," Mainsoft, 2000, 5 pages.

Mayer, "Analyzing the Use of Interfaces in Large OO Projects," ACM, Oct. 2003.

Motorola, Control Management Module (CMM 2000) information sheets: 4 pages; C Motorola, Inc. 2001; https://www.motorola.com/broadband.

Motorola, HFC Manager, Integrated Element Management System information sheets; 4 pages; .COPYRGT. Motorola, Inc. 2003; https://www.motorola.com/broadband.

Motorola Product Detail, HFC Manager 'HFC Element Management System; 1 page: © Motorola, Inc. 2004; https://www.motorola.com/lbroadband.

OCAP Applications in Detail (pp. 1-8), www.tvwithoutborders.com, Feb. 13, 2010.

OpenCable Application Platform Specification ("OpenCable" copyright 2001-2003 pp. 1-398).

OpenCable Host Device, Core Functional Requirements, Issued Specification (OC-SP-HOST-CFR-114-030905), Sep. 5, 2003, 81 pages.

Ran WG1 Meeting #79, San Francisco, USA, Apr. 17-21, 2014.

Scientific Atlanta, ROSA Network Management System and Element Management web pages, 10 pages, © Scientific Atlanta 2006, http://www.scientificatlanta.com.

Scientific Atlanta, Subscriber Networks; Explorer.RTM. 3100HD High Definition DHCT information pages; Oct. 2001; 2 pgs.

Scientific Atlanta, Subscriber Networks; Explorer.RTM. 4200 Home Gateway information pages; Sep. 2003; 3 pgs.

(56) References Cited

OTHER PUBLICATIONS

Scientific Atlanta, Subscriber Products; Explorer.RTM. 8000.TM. Home Entertainment Server information pages; Nov. 2003; 4 pgs.
Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.
Wi-Fi Direct (including inter alia, "Wi-Fi Peer-to-Peer (P2P) Specification"), Version 1.5, 2014, Wi-Fi Alliance, 90 pages.
Xie, et al., "MAPO: Mining API Usages from Open Source Repositories," ACM, May 2006.

* cited by examiner

METHODS AND APPARATUS FOR DEVICE REGISTRATION IN A QUASI-LICENSED WIRELESS SYSTEM

PRIORITY

This application is a continuation of and claims priority to U.S. patent application Ser. No. 16/661,865 filed on Oct. 23, 2019, entitled "METHODS AND APPARATUS FOR DEVICE REGISTRATION IN A QUASI-LICENSED WIRELESS SYSTEM" and issuing as U.S. Pat. No. 11,026,205 on Jun. 1, 2021, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for a high-power wireless transceiver (e.g., Consumer Premises Device (CPE)) registration with a wireless network, such as for example those providing connectivity via quasi-licensed technologies such as Citizens Broadband Radio Service (CBRS), LSA (Licensed Shared Access), TVWS, or Dynamic Spectrum Allocation (DSA).

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA+ up to 21 Mbit/s). |
| | 1900 MHz PCS, Band 2 (UMTS/HSPA+ up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHZ WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
| --- | --- | --- | --- | --- |
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |

TABLE 2-continued

| Frequency range | Type | Center frequency | Availability | Licensed users |
|---|---|---|---|---|
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS and Other "Shared Access" Systems—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider. Comparable technologies are in development, including for instance DSA, TVWS TV White Space), and LSA (Licensed Spectrum Access).

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Spectrum Access Systems (SAS) 202 as shown in FIG. 2 and Appendix I (including e.g., Band 48 therein).

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels. See FIG. 2a.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard SAS 202 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 2, these functions are provided for by, inter alia, an incumbent detection (i.e., environmental sensing) function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the SAS.

A domain is defined is any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to other SAS, such as e.g., a Commercial SAS (CSAS, not shown), and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6m in length if outdoor). Category B CBSDs have 47 dBm EIRP (50 Watts)/10 MHz, and fixed outdoor location only. Professional installation of Category B CBSDs is required, and the antenna must be less than 6m in length. All CBSD's have a vertical positioning accuracy requirement of +/−3m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

Unaddressed Issues of High Power Devices Initial Registration—

Extant spectrum allocation systems such as the CBRS architecture, while useful from the standpoint of e.g., unlicensed spectrum access and reduced contention for spectrum, currently lack mechanisms for initial registration and authentication of a high-power Consumer Premises Equipment (CPE) such as a Fixed Wireless Access (FWA) device. In particular, in the extant CBRS ecosystem, many devices including higher-power CBSD 206 and outdoor FWA devices functioning as CPE are treated or classified as CBSD devices. As previously noted, Category A devices can transmit up 30 dBm (1watt)/10 MHz, while Category B devices can transmit up to about 47 dBm/10 MHz; hence, in practical terms, a Category B device may operate out to thousands of feet or more, the propagation and working range dictated by a number of factors, including the presence of RF or other interferers, physical topology of the application/area, energy detection or sensitivity of the receiver, etc.

However, on an individual transmitter basis, even the foregoing Category B devices are, in comparison to e.g. cellular systems, limited in data throughput and area coverage. Specifically, to provide a high level of performance and greater coverage area, an FWA CPE device has to transmit on comparatively higher power; accordingly, the received Signal-to-Noise Ratio (SNR) and interference ratio is sufficiently high for greater data throughput (using e.g., 256 QAM, 512 QAM and beyond). However, such higher power will violate the Category B EIRP limits enforced in the CBRS system.

High-power CPE are a special class of user equipment for the CBRS band; while current CPE are allowed to transmit at a maximum power 23 dBm, a CPE used for fixed wireless access (FWA) will mostly have an Effective Radiated Power (EIRP) in excess of 23 dBm. Therefore, these devices are treated or categorized as a CBSD (based on their power level), and hence are required to register and be authorized by a SAS prior to starting service.

FIG. 3 illustrates a typical prior art CBRS registration architecture. The FWA/CPE 303 communicates with a CBSD 206 (the latter backhauled by the MSO core 307 and connected to a DP 208 via an access network 309 such as the Internet, the DP communicative with one or more SAS as shown in FIG. 2. However, as alluded to above, this standard CBSD registration architecture does not address certain use cases, including where the CPE EIRP is greater than 23 dBm. For example, in circumstances where CPE 303 is located close to the cell edge or interference signal is strong, the CPE may transmit with EIRP higher than 23 dBm in order to meet the receiver sensitivity requirement at the CBSD with which it is communicating. Generally, a cell edge CPE has a higher probability than those CPEs close to CBSD to be constrained by the maximum EIRP 23 dBm, owing to the compensation for the path large loss.

Moreover, in high density environments, the CPE experiences significant interference from the other users operating in the same frequency or adjacent band. Hence, the CPE may also increase its EIRP in order to compensate for the interference as well as path loss. In such (or similar) circumstances, the CPE with EIRP greater than 23 dBm considered as high-power CPE, cannot initiate the registration procedure with SAS 202.

Furthermore, in the exemplary standard CBRS registration process, the CPE reaching the SAS through the CBSD prior to spectrum allocation can potentially cause interference to incumbents users, as the CPE location is not yet known to the SAS, and no interference analysis is performed by SAS. Similar logic applies to other quasi-licensed architectures such as those previously referenced herein.

Accordingly, there exists a need for a methodology and apparatus to provide registration and authentication for a high power device (such as a CBRS FWA/CPE) with a wireless network such as those described above, including ideally one which avoids the creation of deleterious interference via direct communication between the device and a base station or access point (e.g., CBSD).

SUMMARY

The present disclosure addresses the foregoing needs by providing, inter alia, methods and apparatus for providing registration and authentication of a served CPE (such as e.g., CBRS FWA devices or other similar devices in other context such as DSA or LSA) with a wireless network.

In one aspect, a method for registration and authentication of a client device (e.g., FWA/CPE) is disclosed. In one embodiment, the FWA/CPE being registered is configured to utilize CBRS-band quasi-licensed spectrum, and the method includes communicating data via an alternative connectivity channel between the FWA/CPE and an EMS (element management system) that facilitates registration of the FWA/CPE with a SAS via a domain proxy.

In one variant, the method uses an installer application computer program ("app") to read the client device information, and the installer application utilizes an MNO (mobile network operator) as the connectivity link to transmit information to the host (e.g., MSO) network.

In another variant, the method uses an IoT network as the connectivity link to send the registration information to the MSO network.

In another aspect of the disclosure, a network architecture for delivery of wireless data to at least one fixed wireless receiver apparatus (e.g., CBRS FWA) is disclosed. In one embodiment, the network architecture includes: a plurality of wireless base stations; a computerized network controller in data communication with the plurality of base stations; at least one fixed wireless receiver apparatus; and a computerized premises device in data communication with the at least one fixed wireless receiver and the computerized network controller. In one variant, the computerized premises device includes a wireless-enabled mobile device which is logically communicative with both a process executing on the receiver and a network registration management entity (EMS and associated database), the latter facilitating "side channel" registration.

In one embodiment, apparatus for establishment of an alternate connectivity link between the network and the fixed premises device is disclosed. This alternate link is configured to receive signals from the fixed premises device, and retrieve or/and store premises device information from/to a data base for registration and authentication.

In another aspect, a wireless premise device is disclosed. In one embodiment, the device includes a CBRS (Citizens Broadband Radio Service)-compliant FWA that is capable of data communication with the 3GPP compliant eNB or gNB within CBRS frequency bands. In one embodiment, the FWA/CPE includes a client manager interface for, inter alia, connecting to the host network via the above-mentioned alternate connectivity link via an "opportunistic" intermediary device such as a mobile device. In another embodiment, the FWA includes a low-bandwidth long-range wireless interface for establishment of the alternate link.

In one variant, the FWA apparatus comprises a premises device operated by a network operator (e.g., MSO) that is configured to communicate wirelessly with one or more CBSD/xNB devices to obtain high-speed data services and wireless backhaul from the premises. In one implementation, the FWA apparatus is configured to operate at a sufficiently high power level so as to be classified as a Category B CBSD CBRS device, and is mounted on the user's premises so as to enable the aforementioned backhaul for WLAN or wireline interfaces within the premises.

In an additional aspect of the disclosure, computer readable apparatus is described. In one embodiment, the apparatus includes a storage medium configured to store one or more computer programs, such as a registration/authentication module of the above-mentioned FWA. In another embodiment, the apparatus includes a program memory or HDD or SDD on a computerized registration/authentication controller device, such as an MSO EMS or DP.

In another aspect, a method of operating a wireless network infrastructure comprising a fixed wireless receiver and at least one base station is disclosed. In one embodiment, the method includes: utilizing a first communication channel to cause transmission of at least registration data to a network entity, the first communication channel not utilizing the at least one base station; providing to the fixed wireless receiver via the first communication channel at least radio frequency (RF) spectrum grant data; and based at least in part of the provided spectrum grant data, enabling communication within the granted RF spectrum between the fixed wireless receiver and the at least one base station.

In one variant, the enabling wireless communication within the granted spectrum comprises enabling communication within a frequency range between 3.550 and 3.70 GHz inclusive, and wherein the at least one base station comprises a CBRS (Citizens Broadband Radio Service) compliant CBSD (Citizens Broadband radio Service Device).

In another variant, the enabling wireless communication within the granted spectrum comprises enabling communication within a frequency range between 2.300 to 2.400 GHz band consistent with LSA.

In yet another variant, the enabling wireless communication within the granted spectrum comprises enabling communication within a frequency range between 570 MHz to 790 MHz band consistent with ETSI "White Spaces Devices."

In another variant, the at least one base station performs at least a portion of said wireless communication utilizing 3GPP-compliant 5G NR-U (Fifth Generation New Radio— Unlicensed) air interface technology.

In a further variant, the utilizing a first communication channel to cause transmission of registration data to a network entity comprises utilizing a cellular infrastructure to communicate the registration data to a computerized process of a network operator, the network operator operating the wireless network infrastructure. In one implementation, the utilizing a cellular infrastructure to communicate the registration data to a computerized process of a network operator comprises using the Internet to bridge between the cellular infrastructure and the network operator operating the wireless network infrastructure, the network operator comprising a multiple systems operator (MSO).

In another variant, the utilizing a first communication channel to cause transmission of registration data to a network entity comprises utilizing a long-range unlicensed sub-GHz frequency infrastructure to communicate the registration data to a computerized process of a network operator, the network operator operating the wireless network infrastructure. In one implementation, the utilizing a long-range unlicensed sub-GHz frequency infrastructure to communicate the registration data to a computerized process of a network operator comprises using a wireless interface of the fixed wireless device to communicate directly with a service provider sub-GHz base station.

In a further variant, the method includes using the network entity to: utilize the at least registration data to access a database to obtain second data; and utilize at least the registration data and the second data to generate one or more communications to a domain proxy process in order to enable the domain proxy process to generate a request to one or more SAS processes.

In still another variant, the enabling communication within the granted RF spectrum between the fixed wireless receiver and the at least one base station comprises at least transmitting from the fixed wireless receiver wireless signals at an EIRP greater than 23 dbm.

In another aspect, a network architecture for delivery of wireless data to at least one fixed wireless receiver apparatus is disclosed. In one embodiment, the network architecture includes: at least one wireless base station; a computerized network controller in data communication with the at least one base station; at least one fixed wireless receiver apparatus; and a computerized process in data communication with the at least one fixed wireless receiver and the computerized network controller. In one variant, the computerized process is configured to: receive data enabling registration and authentication of the at least one fixed wireless receiver; cause at least registration of the at least one fixed wireless receiver with a CBRS supervisory process; receive second data relating to a wireless spectrum grant from the CBRS supervisory process or a proxy thereof; and communicate at least a portion of the second data to the computerized network controller and the at least one fixed wireless receiver to enable the at least one fixed wireless receiver to transact data with the at least one base station wirelessly using CBRS quasi-licensed spectrum.

In one implementation, the transaction of data using CBRS quasi-licensed spectrum comprises wireless transaction of data within a frequency range between 3.550 and 3.70 GHz inclusive using at least transmitted waveforms from the fixed wireless receiver at an EIRP greater than 23 dbm. The at least one base station performs at least a portion of said wireless transaction of data utilizing for example 3GPP-compliant 5G NR-U (Fifth Generation New Radio—Unlicensed) air interface technology.

In another variant, the receipt of data enabling registration and authentication of the at least one fixed wireless receiver comprises utilizing a cellular infrastructure to communicate the data to the computerized process via a cryptographically secure tunnel created between an application computer process operative to execute on a mobile user device in data communication with the at least one fixed wireless receiver.

In a further variant, the receipt of data enabling registration and authentication of the at least one fixed wireless receiver comprises utilizing a sub-GHz unlicensed wireless infrastructure to communicate the data to the computerized process via a cryptographically secure tunnel created between an indigenous wireless interface of the at least one fixed wireless receiver, the indigenous wireless interface also configured to transact IoT (Internet of Things) data from the at least one fixed wireless receiver during operation thereof.

In yet a further variant, the network architecture further includes a domain proxy process configured to generate a request to one or more CBRS supervisory processes configured to operate as CBRS SAS processes.

In another aspect, a registration and authentication computerized entity is disclosed. In one embodiment, the computerized entity includes an EMS (element management system) configured to communicate with deployed CBRS-based field devices such as FWA or their proxies (e.g., an intermediary mobile device with MSO app) for alternate channel registration and authentication in association with an MSO-based domain proxy (DP) process.

In a further aspect of the disclosure, a method of enabling utilization of a first wireless transceiver is disclosed. In one embodiment, the method includes: utilizing a first wireless channel to receive to a first network entity a subset of data necessary to enable said utilization; utilizing the received subset of data to access a database of data relating to a plurality of wireless transceivers, the access of the database obtaining a remainder of the data necessary to enable the utilization; and causing transmission of at least the subset of data and the remainder of data to a second network entity, the second network entity configured to generate a request to a third network entity to request registration of first wireless transceiver and allocation of wireless spectrum for use by the first wireless transceiver.

In one variant, the first wireless transceiver includes a CBRS (citizens broadband radio service) fixed wireless access (FWA) device which requires transmission of wireless signals at a power level in excess of a prescribed threshold associated with categorization of the FWA device as a device requiring said registration; and the method further includes receiving, at a base station in data communication with at least the first network entity, the wireless signals transmitted at the power level.

In one implementation thereof, the first network entity includes a computerized network process of a managed content distribution network, the second network entity includes a CBRS domain proxy (DP), and the third network entity includes a CBRS SAS (spectrum allocation system), and wherein the causing transmission of the subset of data and the remainder of data further includes generating, by at least the first network entity, one or more messages configured to cause said DP to issue said request, said one or more messages complying with a standardized protocol utilized by the DP.

In yet another variant, the utilizing a first wireless channel to receive to a first network entity a subset of data necessary to enable said utilization includes receiving the subset via at least long-range, low-bandwidth channel, the channel established using at least a second wireless transceiver in data communication with the first wireless transceiver. In one implementation thereof, the receiving the subset via at least long-range, low-bandwidth channel, the channel established using at least a second wireless transceiver in data communication with the first wireless transceiver further includes receiving a plurality of data packets formatted according to a protocol configured to minimize transmission overhead, the minimizing transmission overhead configured to meet a target transmission parameter selected from the group consisting of: (i) a target total transmission duration for the subset; and (ii) a target total transmission payload size for the subset.

In yet a further aspect, methods and apparatus for utilizing index or flag data for wireless device registration and authentication is disclosed. In one embodiment, the index or flag data is selected to uniquely identify the wireless device within a given operator's network, and is purposely configured to utilize a minimum of bandwidth for transmission, and also to allow a recipient process to access a database to obtain a richer or more complete set of data as needed for subsequent registration and authentication, thereby obviating having to transmit the additional data over a low-bandwidth channel.

In a further aspect, a domain proxy (DP) computerized entity is disclosed.

In still a further aspect, a system architecture for FWA/CPE registration with a wireless network utilizing unlicensed or quasi-licensed CPE is disclosed.

In another aspect, a method of facilitating unlicensed or quasi-licensed cell deployment is disclosed.

These and other aspects shall become apparent when considered in light of the disclosure provided herein.

Figure 1:
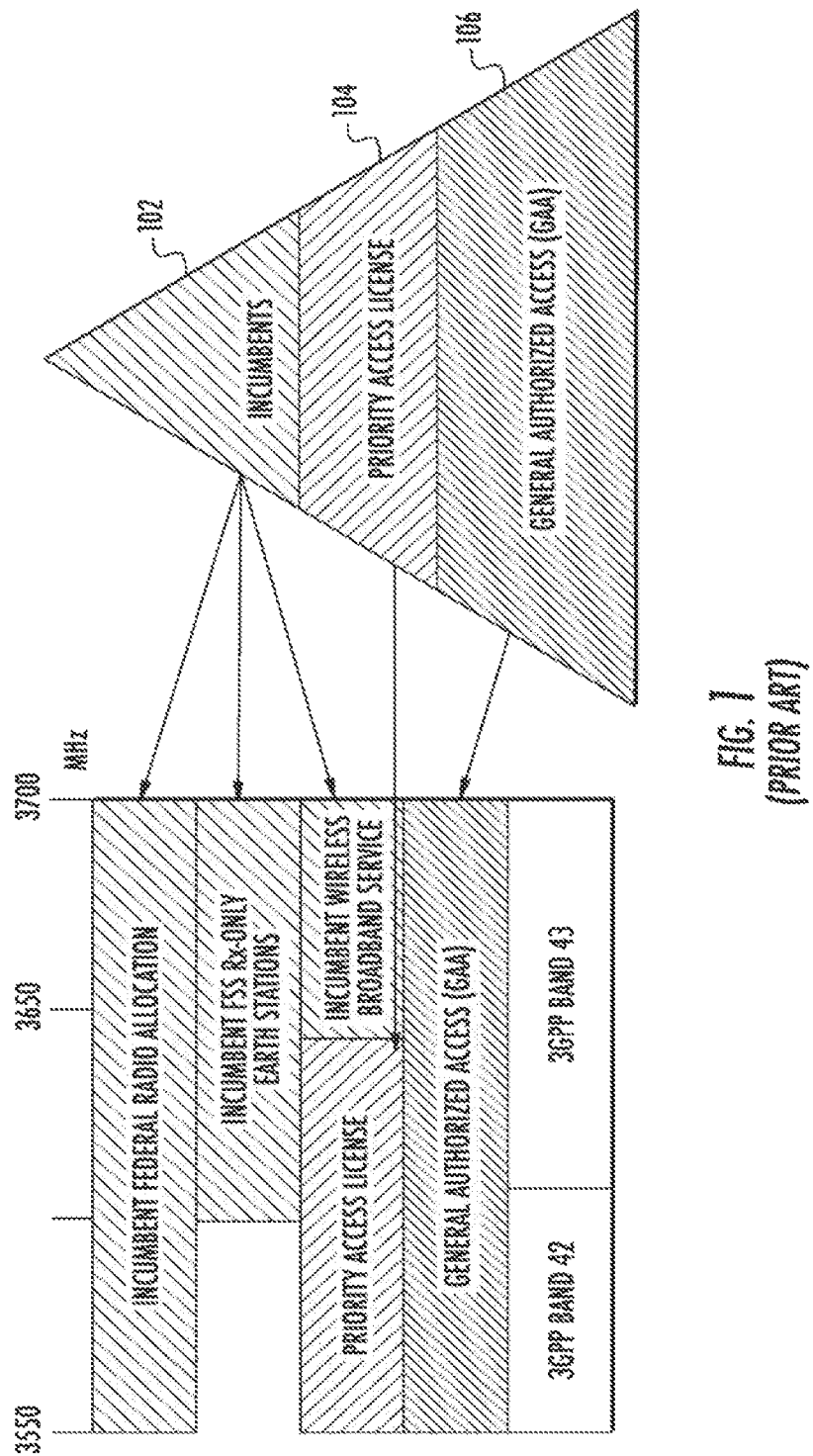
FIG. 1 is a graphical illustration of prior art CBRS (Citizens Broadband Radio Service) users and their relationship to allocated frequency spectrum in the 3.550 to 3.700 GHz band.
Figure 2:
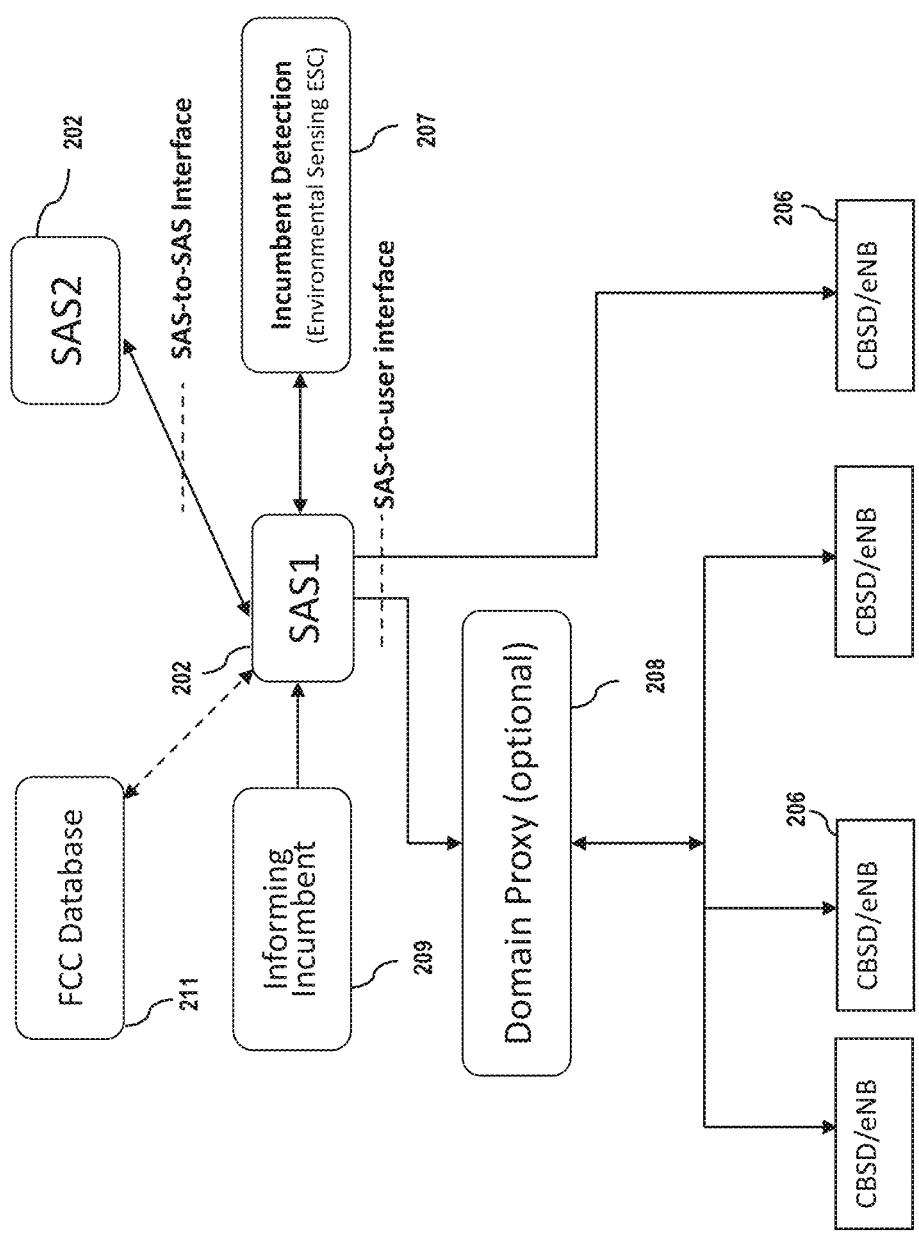
FIG. 2 is a block diagram illustrating a general CBRS system SAS and DP architecture according to the prior art.
Figure 2A:
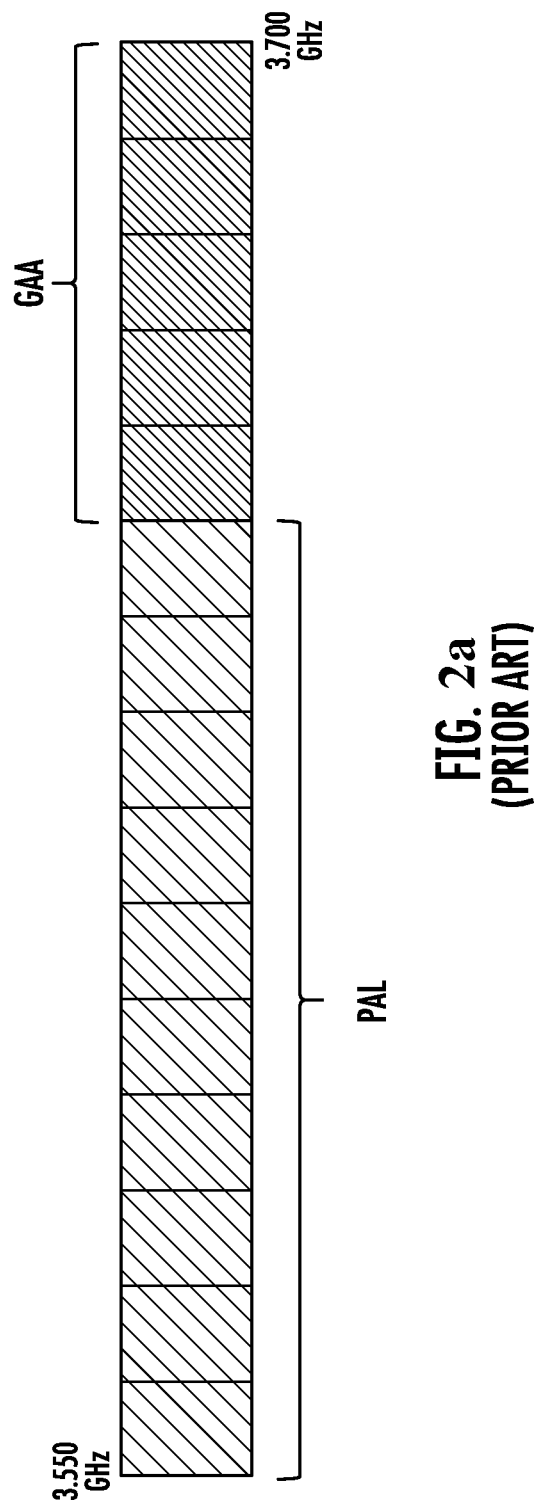
FIG. 2a is a graphical representation of allocations for PAL versus GAA users within the frequency bands of FIG. 1.

All figures © Copyright 2019 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3 D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAE (Spectrum Allocation Entity)" refers without limitation to one or more entities or processes which are tasked with or function to allocate quasi-licensed spectrum to users. Examples of SAEs include SAS (CBRS). PMSE management entities, and LSA Controllers or Repositories.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a FWA/CPE or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "xNB" refers to any 3GPP-compliant node including without limitation eNBs (eU-TRAN) and gNBs (5G NR).

Overview

In one salient aspect of the present disclosure, methods and apparatus for registering and authenticating high-power device or CPE (e.g., a CBRS FWA) are provided such that they are allowed to register and operate in the network without having to utilize their primary (high power) air interface. In one embodiment, the methods and apparatus utilize quasi-licensed CBRS wireless spectrum in conjunction with (i) an auxiliary or "side" channel for communication; (ii) a domain proxy (DP), registration controller and database; and (iii) a CBSD controller that allocates frequency, base station, and transmit/receive resources for delivery of services to a number of installed fixed wireless apparatus (FWA) at user or subscriber premises.

In one variant, the high-power FWA/CPE initially connects to an application program operative to execute on an intermediary device (e.g., a UE of a network installer), the latter which establishes a channel and sends the registration information to the DP using a wired or wireless network interface (e.g., via an MNO cellular network), and receives a spectrum grant via the same channel.

In another variant, the high-power FWA/CPE initially connects to the MSO infrastructure for registration via an embedded IoT interface installed in the FWA/CPE. The high-power FWA/CPE sends the registration information to the SAE (e.g., a CBRS SAS) via an IoT interface (and receives the spectrum grant back through the same channel).

In one variant, an EMS/FWA database is provided to store or/and retrieve FWA/CPE registration and profile data.

Notably, by providing such alternative connectivity to the FWA/CPE, rapid and easy cell deployment and configuration/update is achieved, including in many cases obviating "truck rolls" by leveraging the specific attributes of the CBRS and MSO infrastructure. In some scenarios, user-based installation, registration, updating and even troubleshooting is envisioned, such as via an instructive application configured to execute on the user's mobile device or home PC/laptop or other such consumer device.

The ability of the MSO or other entity to perform a "health check" of the CPE through alternate access channels is also advantageously provided, especially during any channel revocation which disconnects the CPE from the MSO backhaul (e.g., the CBSD and its supporting infrastructure).

The methods and apparatus described herein may also advantageously be extended to other shared-access architectures (i.e., other than CBRS) such as for example DSA, LSA, and TVWS systems.

Detailed Description of Exemplary Embodiments

Exemplary embodiments of the apparatus and methods of the present disclosure are now described in detail. While these exemplary embodiments are described in the context of the previously mentioned wireless access points (e.g., CBSDs) associated with e.g., a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, Internet Protocol DARPA Internet Program Protocol Specification, IETF RCF 791 (September 1981) and Deering et al., Internet Protocol, Version 6 (IPv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality. For instance, as described in greater detail below, network (e.g., MSO)-specific or proprietary protocols may be used consistent with various embodiments, such as to reduce network transaction overhead on low-bandwidth links.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" systems or other spectrum, including without limitation DSA, LSA, or TVWS systems, and those above 4.0 GHz (e.g., currently proposed allocations up to 4.2 GHz, and even millimeter wave bands such as those between 24 and 100 GHz).

Additionally, while described primarily in terms of GAA 106 spectrum allocation (see FIG. 1), the methods and apparatus described herein may also be adapted for allocation of other "tiers" of CBRS or other unlicensed spectrum (whether in relation to GAA spectrum, or independently), including without limitation e.g., so-called Priority Access License (PAL) spectrum 104.

Moreover, while described in the context of quasi-licensed or unlicensed spectrum, it will be appreciated by those of ordinary skill given the present disclosure that various of the methods and apparatus described herein may be applied to reallocation/reassignment of spectrum or bandwidth within a licensed spectrum context; e.g., for cellular voice or data bandwidth/spectrum allocation, such as in cases where a given service provider must alter its current allocation of available spectrum to users.

Further, while some aspects of the present disclosure are described in detail with respect to so-called "4G/4.5G" 3GPP Standards (aka LTE/LTE-A) and so-called 5G "New Radio" (3GPP Release 15 and TS 38.XXX Series Standards and beyond), such aspects—including allocation/use/withdrawal of CBRS spectrum—are generally access technology "agnostic" and hence may be used across different access technologies, and can be applied to, inter alia, any type of P2MP (point-to-multipoint) or MP2P (multipoint-to-point) technology, including e.g., Qualcomm Multefire.

Other features and advantages of the present disclosure will immediately be recognized by persons of ordinary skill in the art with reference to the attached drawings and detailed description of exemplary embodiments as given below.

High-Power FWA/CPE Registration/Authentication Architecture—

Figure 4A:
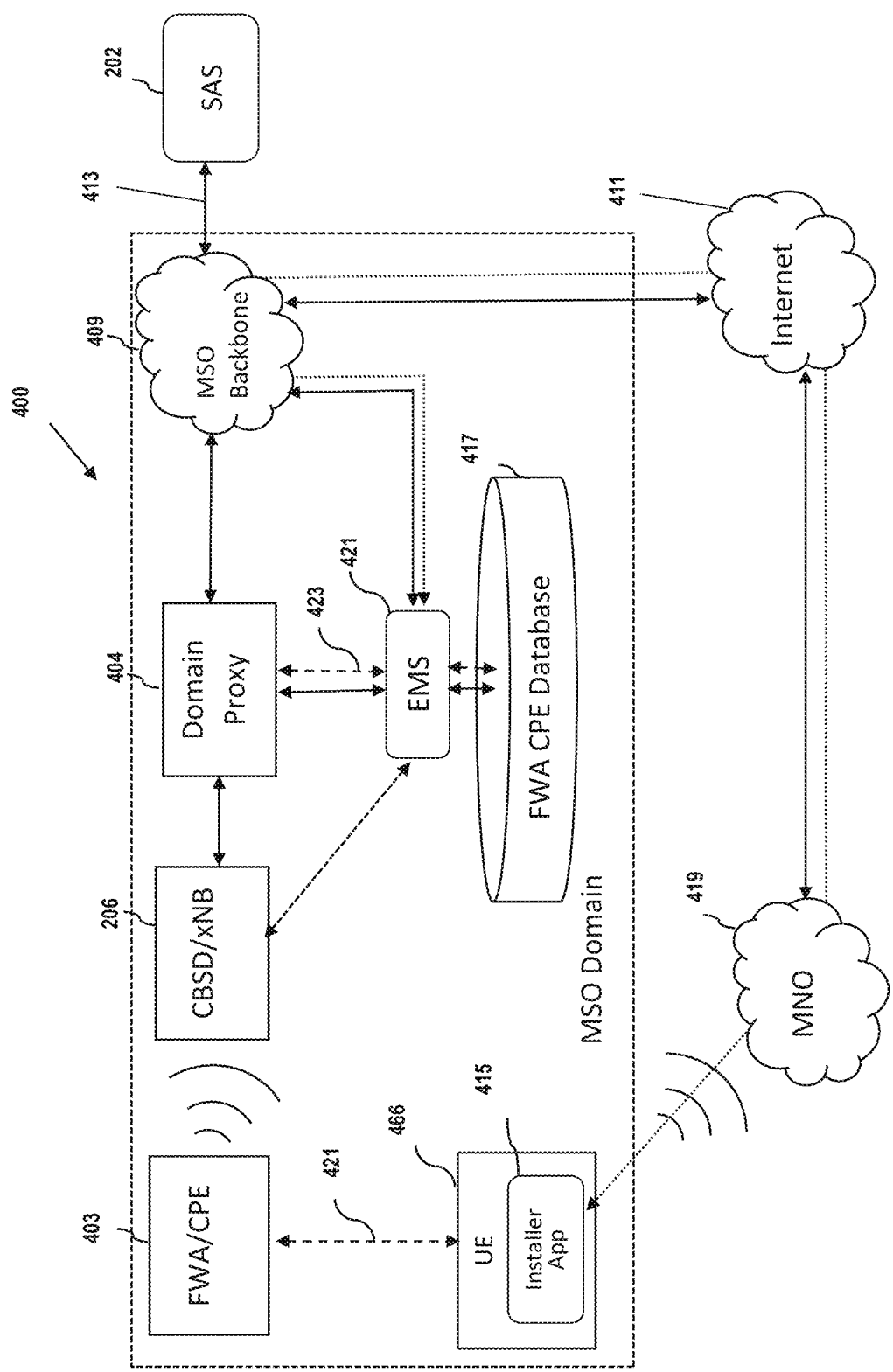
FIG. 4A is a functional block diagram illustrating a first exemplary CPE registration network configuration according to the present disclosure.

FIG. 4A illustrates a first embodiment of a service provider network configuration configured to enable FWA/CPE registration as described herein. It will be appreciated that while described with respect to such network configuration, the methods and apparatus described herein may readily be used with other network types and topologies, whether wired or wireless, managed or unmanaged.

FIG. 4A illustrates a first exemplary embodiment of the network architecture described herein. It will be appreciated that while described primarily in terms of CBSD/xNBs 206 which also include EUTRAN (3GPP) compliant eNodeB and/or gNodeB functionality, the latter is by no means of requirement of practicing the broader features of the invention, and in fact non-3GPP signaling and protocols may be utilized to support the various functions described herein. Due to its current ubiquity (especially in mobile devices or UEs), however, the extant 3GPP protocols provide a convenient and effective platform which can be leveraged for CBRS-based operation. Moreover, the various aspects of the disclosure are not limited to CBRS-based frequencies or infrastructure, but rather may conceivably be applied to any fixed architecture wireless system with multiple transmitters and receivers.

In the embodiment of FIG. 4A, the FWA/CPE 403 connects to an MNO network 419 for initial registration via an intermediary device such as a UE 466 with Certified Professional Installer (CPI) application 415 installed thereon. The CPI application 515 (e.g. a software application installed on a smartphone, tablet, or laptop computer) is the interface between the FWA/CPE 403 and the MS network entity (EMS) 421. In one approach, the Installer application 415 is required to be in communication with (e.g., in proximity of) the FWA/CPE 403 for initial registration. Specifically, the Installer application connects to the FWA/CPE using a wired or wireless link 521 (e.g. Ethernet, USB/micro-USB, Bluetooth or Wi-Fi). The Installer app 415 reads the cognizant FWA/CPE information (e.g. frequency, signal strength (e.g. RSSI, EIRP), legal entity, device identity, CBSD parameters, or other metrics required in assessing CPE authentication and/or registration), as described in detail in Table 4 shown below.

TABLE 4

| Required Parameter | | Size |
|---|---|---|
| userId | | min 72-max 253 [octets] |
| fccId | | 19 [characters] |
| cbsdSerialNumber | | 64 [octets] |
| cbsdCategory | | 1 [bit] |
| airInterface | radioTechnology | 2 [bits] |
| installationParam | latitude | 4 [octets] |
| | longitude | 9 [octets] |
| | height | 8 [bits] |
| | heightType | 1 [bit] |
| | indoorDeployment | 1 [bit] |
| | antennaAzimuth | 9 [bits] |
| | antennaDowntilt | 1 [octet] |
| | antennaGain | 1 [octet] |
| | antennaBeamwidth | 9 [bits] |
| measCapability | | 2 [bits] |
| professionalInstallerData | cpiId | max 256 [octets] |
| | cpiName | max 256 [octets] |
| | installCertificationTime | 13 [bits] |

In one embodiment, the app 415 utilizes an API call to logic within the protocol stack of the FWA/CPE 403 (see FIG. 10A), and the API executes and returns the requisite data to the app via the data link between the devices. Other approaches may be used as well, including HTTP "GET" operations, data push/pull protocols, etc.

After the Installer app reads the FWA/CPE information, the Installer application establishes a communication channel with the cognizant network entity (here, the EMS 421) and transmits the data thereto. In one variant, the channel comprises a VPN tunnel or HTTPS session between the EMS and the Installer app 415 carried over an MNO bearer (e.g., LTE or 5G NR connection) between the UE 466 and a serving MNO infrastructure and the Internet. For instance, the EMS may be accessible via an https//url address or the like. Note that the read or push/pull of the FWA/CPE data and the establishment of the Installer app-to-EMS channel need not necessarily occur simultaneously; in one implementation, the registration/authentication data can be pulled from the FWA/CPE and stored until an appropriate alternate channel becomes available.

After receipt of the data by the EMS 421, the EMS and FWA/CPE database 417 provide the required information for registering FWA/CPE with the SAS to the domain proxy (DP) 404 via the interposed communication link and protocol 423. In addition, the FWA/CPE profile and other data are saved in the FWA/CPE database with a unique ID for future use. It will be appreciated that various scenarios or approaches for assigning an ID to the FWA/CPE 403 may be used consistent with the present disclosure. In one variant, the device 403 is assigned an ID at initial provisioning (e.g., before delivery to the premises for installation). In another variant, the ID is assigned during the initial registration/authentication procedure, such as based on its unique MAC address (which may be known to the MSO EMS 421 via the DB 417). Yet other approaches will be recognized by those of ordinary skill given the present disclosure.

The communication between the SAS 202 and DP 404 is in one embodiment conducted over an extant standardized interface 413, thereby obviating any special or custom channel or protocol for communications between the MSO DP and the (non-MSO) SAS. As described below, the DP 404 in effect acts as an emulator or normalizer to convert any data obtained from the EMS 421 and DB 417 into appropriate protocol messages for interface with the (standardized) SAS.

Returning to FIG. 4A, the SAS 402 registers and authorizes the FWA/CPE 403 for transmitting and receiving data with the CBSD/xNB via a registration ans spectrum grant. The registration status/grant data is communicated to the FWA/CPE 403 through the domain proxy and the alternate channel between the EMS 421 and CPE Installer application 415. Similarly, the cognizant CBSDs 206 are informed of the spectrum allocation/registration so that the FWA/CPE will be recognized as an authorized "user" upon initial connection establishment. After the FWA/CPE succeeds in registration, it begins transmission and connects to the CBSD 206 on the assigned spectrum channel(s).

Figure 4B:
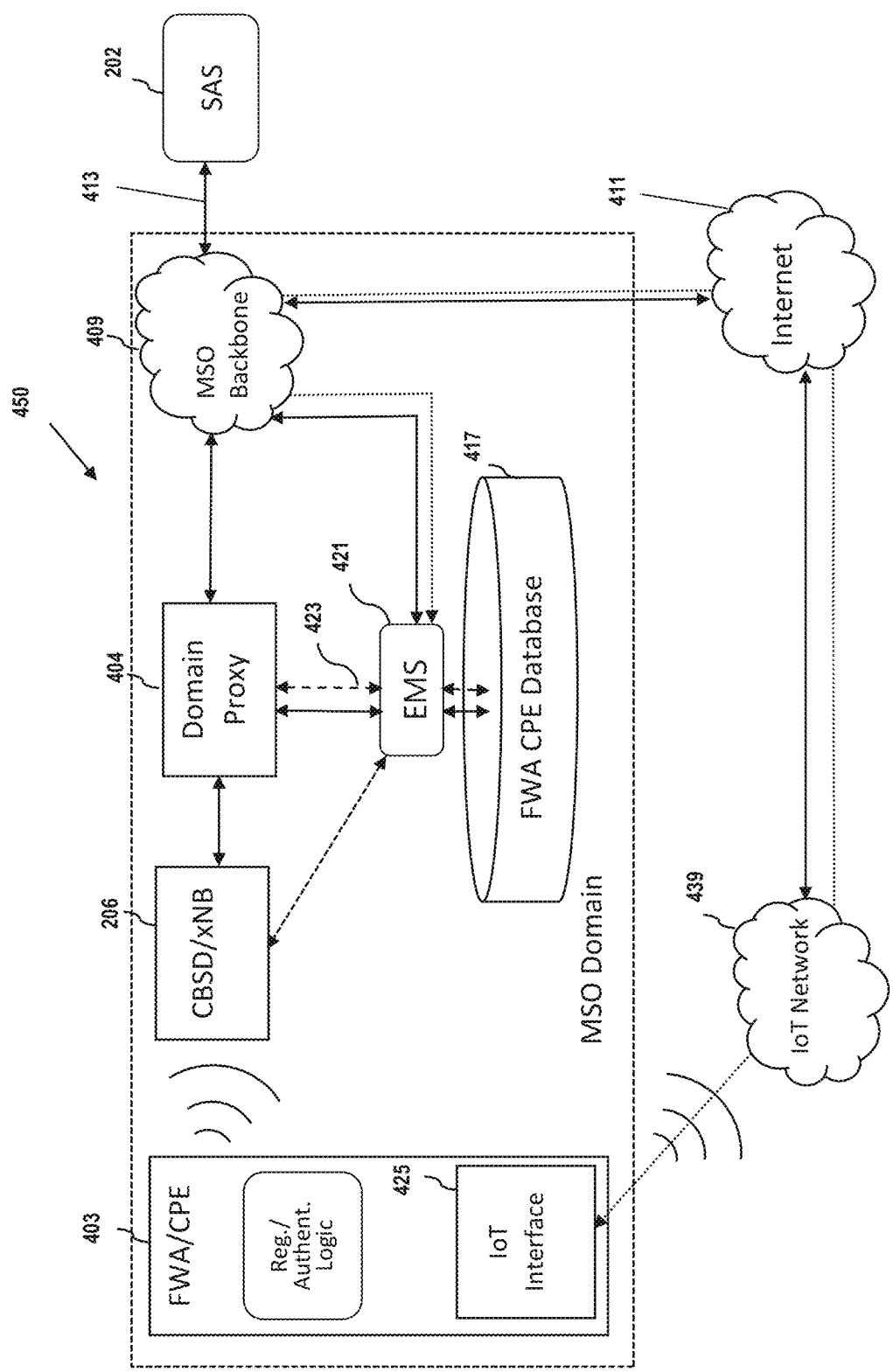
FIG. 4B is a functional block diagram illustrating a second exemplary CPE registration network configuration according to the present disclosure.

FIG. 4B illustrates a second exemplary embodiment of the network architecture 450. In this embodiment, the FWA/CPE 403 connects to an IoT network 439 (e.g. LoRa/NB-IoT/SigFox) for the initial registration via an IoT interface 425 installed on the FWA/CPE 403. Since the IoT network 439 supports only a very low data rate in one variant, a pre-established unique ID and coded message is used in one embodiment for initial registration and communication between the FWA/CPE 403 and EMS 421. In one implementation, a software process executing on the FWA/CPE stack is configured to generate the pre-established protocol messages (suitable for transmission over the IoT network 439) prior to transmission, thereby obviating the need for the UE 466 and associated Installer app 415 as in FIG. 4A. However, the embodiment of FIG. 4A is also opportunistic (i.e., a UE can be brought into range of the IoT interface 425 to use the UE WLAN/LAN/PAN interface to communicate therewith, whereas the LoRa/SigFox infrastructure is generally fixed in nature). Moreover, the MNO data channel can sustain much higher bandwidths/data rates as compared to the IoT network 439. As such, the present disclosure contemplates the availability of both approaches; i.e., a FWA/CPE with both IoT interface 425 and support for UE/installer app 415, with use of one selected to optimize the desired parameters or functionality; e.g., where no IoT service is available or higher alternate channel bandwidths are required (such as for transmission of imagery or other larger data sets), the MNO option is used, or vice versa.

In one approach, when the FWA/CPE 403 needs to register with the SAS 202, the device's unique ID is sent over the IoT access network 439 to the EMS 421. This unique ID is used to retrieve the associated full profile from the FWA CPE database 417. As with the embodiment of FIG. 4A, the alternate channel (IoT network 439) is in one implementation used for all of the SAS-related communications through the EMS and DP. Likewise, on the return, the EMS maps the standard SAS messages to set of protocols to enable these messages to be transmitted over the high-latency, low bandwidth IoT access network 439.

It will be appreciated that the alternate or side-channel utilized by the various approaches described herein may be configured for comparatively low bandwidth/capability, with the amount of data being transacted between the FWA/CPE 403 (or Installer app 415) and the EMS 421 being comparatively low, since latency is not an issue in many use cases (i.e., there are no QoS or other such requirements). For example, the following calculation demonstrates exemplary values for such data:

Payload range
Minimum 224 to Maximum 869 octets
Transport layer overhead
For UDP 20+8=28 octets
For TCP 20+20=40 octets
Additional connection setup and maintenance overhead
Payload range with transport layer overhead
Minimum 252 to Maximum 909 octets Hence, a typical Tx time range (over an exemplary LoRa sub-GHz interface with 27 kbps nominal bandwidth) is on the order of 50 to 180 seconds.

In the context of the foregoing, it will be noted that the payload restrictions for the exemplary LoRa messages differ across different geographic regions (e.g., Europe, Asia, Australia, Americas, etc.). In the U.S. for example, at the most stringent spreading factor, the payload may be restricted to 11 bytes, due channel occupancy limitations imposed by the FCC. In other regions, the payload may be higher than 11 bytes, but the LoRa access has higher latency across all regions. This makes these channels non-ideal for higher-overhead protocols such as IP based communications. However, the LoRa spectrum and technology is very attractive in the U.S. (and in fact other regions) due to sub-GHz propagation characteristics (i.e., comparatively long range for LoRa communications).

Accordingly, in some exemplary implementations of the present disclosure, a proprietary small- or low-overhead message protocol is utilized to perform the aforementioned LoRa access exchanges. Specifically, the above-referenced byte limitations are observed, and the protocol is configured to deliver the requisite data needed by the MSO network entities (e.g., EMS and DP functions) to formulate and transmit a SAS request. For instance, in one variant, the EMS/FWA-CPE function receives a small amount of data (albeit within 11 bytes of LoRa payload), and uses this received data as an "index" for accessing the FWA CPE database to retrieve the complete profile, and use the latter to formulate the SAS messages and send them through the Domain proxy (DP) to obtain the necessary grants to enable the FWA CPE to operate on the CBRS network including at the level of power necessary to properly communicate with the target CBSD/xNB(s) serving that premises. In this fashion, the transmitted data leverages the relevant configuration data and other information in the MSO network based database, thereby obviating transmission of such data over the comparatively low-bandwidth side-channel (e.g., LoRa), which may take prohibitively long time, and necessitate longer technician or installer service calls for the user (thereby detracting from overall user experience).

In one implementation of the foregoing, the transmitted data (index) comprises all or a portion of an FWA/CPE device's MAC address (issued at manufacture), such as the last several digits, enabling unique identification within the MSO FWA database. In another implementation, the transmitted data is all or a portion of a user-specific or premises-specific MSO account number. In yet another implementation, the transmitted data is all or a portion of a device-specific serial number, such as that issued by a manufacturer of the device. It will be appreciated by those of ordinary skill given this disclosure that other forms and types of data may be used consistent with the disclosure for purposes of enabling registration/authentication and spectrum grants, including data which is cryptographically protected, data which is FEC protected (e.g., over-coded at e.g., ⅓ or ⅔ rate), data which is multiplexed (e.g., for concurrent registration of two or more FWA/CPE), and any other ancillary or supporting data which may be required to enable the aforementioned "index" or lookup functionality. Moreover, where another long-range (or suitably ranged) technology with greater bandwidth is used as the side channel for registration/authentication, more elaborate protocols may be used in such applications consistent with the present disclosure.

Figure 5:
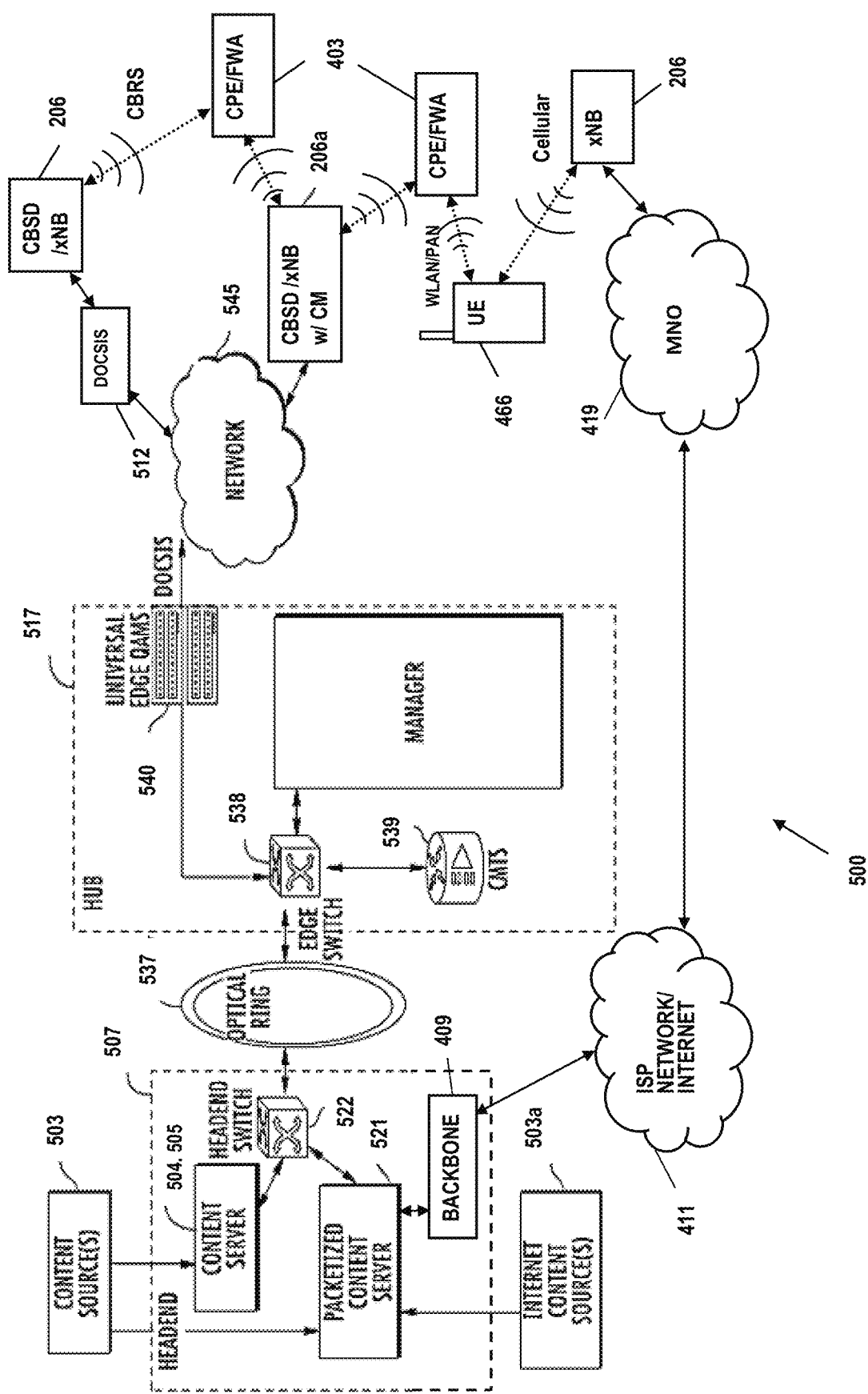
FIG. 5 is a functional block diagram of a first exemplary embodiment of an HFC-based distribution and backhaul network architecture according to the present disclosure.

FIG. 5 illustrates an exemplary MSO network architecture for the delivery of packetized content (e.g., encoded digital content carried within a packet or frame structure or protocol) that may be used in support of the architectures 400, 450 of FIGS. 4A and 4B, respectively. In addition to on-demand and broadcast content (e.g., live video programming), the system of FIG. 5 may deliver Internet data and OTT (over-the-top) services to the end users (including those of the access nodes 4) via the Internet protocol (IP) and TCP, although other protocols and transport mechanisms of the type well known in the digital communication art may be substituted.

The network architecture 500 of FIG. 5 generally includes one or more headends 507 in communication with at least one hub 517 via an optical ring 537. The distribution hub 517 is able to provide content to various user/client devices 506, and gateway devices 560 as applicable, via an interposed network infrastructure 545. The illustrated FWA/CPE 524 includes in one implementation an outdoor Fixed Wireless Access (FWA) application of CBRS. In FWA applications, the CBSD/xNB communicates wirelessly with a Customer Premises Equipment (CPE) mounted on the customer's house or office (e.g., mounted rooftop, on a pole, etc.); see the outdoor portion 403a of the exemplary CPE device of FIGS. 10A and 10B. User devices such as 3GPP-compliant UE (e.g., smartphones or other mobile devices) may also be in direct communication with the CBSD/xNB, although due to mobility, such UE are not included within the population of FWA/CPE reporting to the network controller 610 as described elsewhere herein.

Various content sources 503, 503a are used to provide content to content servers 504, 505 and origin servers 521. For example, content may be received from a local, regional, or network content library as discussed in U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 503a (such as e.g., a web server) provide Internet content to a packetized content origin server(s) 521. Other IP content may also be received at the origin server(s) 521, such as voice over IP (VoIP) and/or IPTV content. Content may also be received from subscriber and non-subscriber devices (e.g., a PC or smartphone-originated user made video).

The centralized media server(s) 521, 504 located in the headend 507 may also be replaced with or used in tandem with (e.g., as a backup) to hub media servers (not shown) in one alternative configuration. By distributing the servers to the hub stations 517, the size of the fiber transport network associated with delivering VOD services from the central headend media server is advantageously reduced. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, etc., subscriber CPE-based session requests (e.g., from a user's DSTB or the like), while a different configuration or architecture may be used for servicing mobile client requests. Similarly, the content servers 521, 504 may either be single-purpose/dedicated (e.g., where a given server is dedicated only to servicing certain types of requests), or alternatively multipurpose (e.g., where a given server is capable of servicing requests from different sources).

The network architecture 500 of FIG. 5 may further include a legacy multiplexer/encrypter/modulator (MEM; not shown). In the present context, the content server 504 and packetized content server 321 may be coupled via a LAN to a headend switching device 522 such as an 802.3z Gigabit Ethernet (or "10G") device. For downstream delivery via the MSO infrastructure (i.e., QAMs), video and audio content is multiplexed at the headend 507 and transmitted to the edge switch device 538 (which may also comprise an 802.3z Gigabit Ethernet device) via the optical ring 537.

In one exemplary content delivery paradigm, MPEG-based video content (e.g., MPEG-2, H.264/AVC or HEVC/H.265) may be delivered to user IP-based client devices over the relevant physical transport (e.g., DOCSIS channels); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's DSTB or other receiver device for viewing on the television, and also as packetized IP data over the DOCSIS QAMs to the user's PC or other IP-enabled device via the user's cable modem 512 (including to end users of the CBSD/xNB access node 206 and FWA/CPE 403). Delivery in such packetized modes may be unicast, multicast, or broadcast.

Delivery of the IP-encapsulated data may also occur over the non-DOCSIS QAMs, such as via IPTV or similar models with QoS applied.

Individual devices such as cable modems 512 and associated edge devices 206, 206a of the implementation of FIG. 5 may be configured to monitor the particular assigned RF channel (such as via a port or socket ID/address, or other such mechanism) for IP or other types of packets intended for the subscriber premises/address that they serve. The IP packets associated with Internet services are received by edge switch, and forwarded to the cable modem termination system (CMTS) 539. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the CBSDs 206 and ultimately the recipient FWAs 403 and associated client devices. The IP packets are typically transmitted on RF channels that are different than the "in band" RF channels used for the broadcast video and audio programming, although this is not a requirement. As noted above, the edge devices such as cable modems 512 are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 540. According to this embodiment, all of the content is delivered on DOCSIS channels, which are received by a cable modem 512 or other CM-equipped device 206a, and distributed to one or more respective FWA CPE or client devices 403 in communication therewith.

In one implementation, the CM 512 shown in FIG. 5 services a CBSD or xNB 206 which in turn services an area which may include a prescribed premises or venue, such as an apartment building, conference center or hospitality structure (e.g., hotel) via one or more FWA/CPE nodes 403 for CBRS-band (3.5 GHz) access. The FWA/CPE 403 may also provide connectivity for a WLAN router (i.e., the FWA/CPE acting as a radio head for attached router which provides more localized WLAN services to portions of the premises), which provides e.g., Wi-Fi access for users at the premises. The FWA/CPE 403 may also communicate wirelessly with non-MSO CBSD/xNB devices operated by e.g., an MNO for backhaul via that MNO's infrastructure (not shown).

In parallel with (or in place of) the foregoing delivery mechanisms, the MSO backbone 409 and other network components can be used to transact packetized data to the user's mobile client device 566 via non-MSO networks, including for registration and authentication purposes as described elsewhere herein.

Moreover, so-called "OTT" content (whether tightly coupled or otherwise) can be ingested, stored within the MSO's network infrastructure, and delivered to the user's mobile device via an interposed ISP (Internet Service Provider) network and public Internet 411 (e.g., at a local coffee shop, via a Wi-Fi AP connected to the coffee shop's ISP via a modem, with the user's IP-enabled end-user device 566 utilizing an Internet browser or MSO/third-party app to stream content according to an HTTP-based approach).

Figure 6:
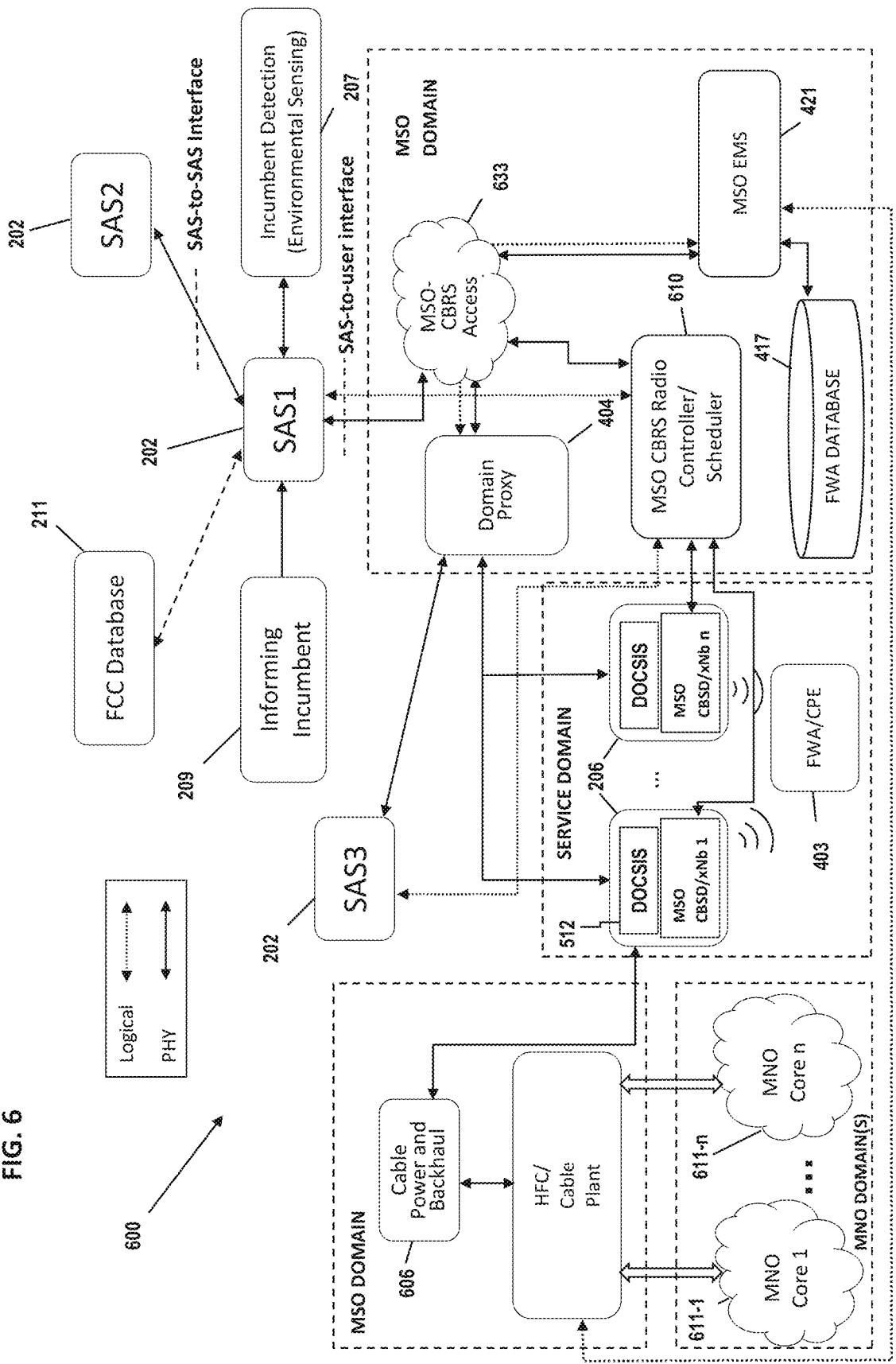
FIG. 6 is a functional block diagram of a first exemplary embodiment of an HFC-based CPE registration network architecture according to the present disclosure

FIG. 6 illustrates an exemplary embodiment of an MSO network architecture 600 useful in implementing the FWA/CPE registration and authentication functionality according to the present disclosure.

As shown, the illustrated embodiment of the architecture 600 may generally include if desired an MSO-maintained CBRS controller 610 (which may be disposed remotely at the backend or headend of the system within the MSO domain as shown or at a served venue, or at an intermediary site), an MSO-maintained Element Management System (EMS) 421 and FWA/CPE database 417 (as previously described), multiple CBSD/xNB access nodes 206 in data communication with the CBRS controller 610 (e.g., via existing network architectures including any wired or wireless connection), as well as any number of CPE/FWA devices 403, and other client devices (smartphones, laptops, tablets, watches, vehicles, etc., not shown). The CBSD/ xNBs 206 include in the illustrated embodiment an embedded cable modem 512 used for communication with a corresponding CMTS 539 (FIG. 5) within the MSO's (e.g., cable) plant via cable power and backhaul infrastructure 606, including high-data bandwidth connections to the MSO's backbone 409, and electrical power for the CBSD/xNB. An MNO (mobile network operator) network 439 also may communicate with the MSO network via the backhaul 606, such as for inter-operator communications regarding common users/subscribers; however, this is by no means a requirement of the present disclosure, and in fact the MNO network may be completely dissociated from the MSO network other than having data connectivity for e.g., user-plane (UP) traffic.

It will be appreciated that while a single network controller entity 610 is shown in FIG. 6, the architecture may in fact include two or more such controllers, each allocated (whether statically or dynamically) to a subset of the access nodes 206 of the network.

As shown in FIG. 6, in operation, the Domain Proxy (DP) 404 is in logical communication with the CBSD/xNB disposed at the service area, node, premises or venue (either directly, as shown, or via MSO backend network infrastructure) and the MSO CBRS network controller entity 610. The DP 404 provides, inter alia, SAS interface for the CBSD/xNB and EMS 421 as described elsewhere herein, including directive translation between CBSD/xNB or EMS and SAS commands, bulk CBSD/xNB directive processing, and interference contribution reporting to the SAS (i.e., to help an SAS tune or update its predictive propagation models and detect realistic interference issues once CBSDs/xNBs are deployed, the CBSDs/xNBs and even attached FWA/CPE 403 can provide signal strength, phase/timing, and interference level measurements, in addition to or as part of those provided to the network controller 610 as part of CBSD/xNB/Beam/slot allocations.

The MSO network controller entity 610 (or entities) in the illustrated embodiment communicates with the DP 404 via an MSO CBRS access network 633, which may be a public internetwork (e.g., the Internet), private network, or other, depending on any security and reliability requirements mandated by the MSO and/or SAS.

As used herein, a CBRS "domain" is defined is any collection of CBSDs/xNBs 206 that are or need to be grouped for management, whether logically or by other scheme; e.g.: according to network operator (NO), according to a serving SAS vendor, by radio path propagation characteristics, and/or by physical disposition (e.g., within a large enterprise, venues, certain geographic area, etc.) In the embodiment of FIG. 6, the DP 404 aggregate control information flows to the SAS1 402 and/or any participating other SAS (SAS2), which may be e.g., a Commercial SAS (CSAS)), and generates performance reports, channel requests, heartbeats, and other types of data, including data necessary for operation of the spectrum allocation and reassignment algorithms described in greater detail subsequently herein. In the illustrated embodiment, the DP 404 is operated by the MSO, although it will be appreciated that a third party may operate and maintain the DP 404.

As previously noted, one primary attribute of the disclosure relates to its ability to connect and register a high-power FWA/CPE 403 to SAS; specifically, for high-power FWA/CPE initial registration transmitting at e.g., more than allowable EIRP 23 dBm. It will be appreciated by those of ordinary skill given the present disclosure that the transmission periods during which the FWA/CPE comprises a "high power" FWA may vary; i.e., the FWA/CPE may operate as both a high-power and non-high power device depending on use case and application.

Also notably, since the FWA/CPE 403 are all presumed to be fixed in location in the exemplary embodiments, and hence no traditional "mobility" aspects such as those involved with cellular systems need be accounted for, the functions (and functional allocation) between the various components of the network (e.g., RAN, core, etc.) and the client (here, the FWA/CPE), the architecture 600 is more optimized in some regards. Specifically, since the physical/spatial relationships between the FWA/CPE (fixed) and CBSD/xNBs (also fixed) are known a priori, many calculations can be obviated, and barring any significant other changes in path metrics, one or more given CBSD/xNBs 206 can be used to serve one or more given FWA/CPE devices 403 with some degree of stability and reliability; i.e., a high-power FWA/CPE will likely always need to operate as such since it's path loss and other physical relationships to the serving CBSD(s) are known in advance.

To the degree that a new FWA/CPE or CBSD/xNB is installed within the architecture (e.g., a new customer is added), this new installation may be characterized as to its RF propagation characteristics via install/startup testing, and the results of the characterization used to assign the new FWA/CPE 403 to a "host" network controller 610 by virtue of the CBSD/xNBs with which the new CPE "best" communicates (as well as other factors such as controller loading).

In the exemplary configuration, the high-power FWA/CPE 403 may connect to the SAS via the alternative MNO network and EMS/DP initially (see discussion of FIGS. 4A and 4B) for passing registration and authentication data, as well as other types of data. For example, this other data may include data relating to the e signals received from various CBSD 206 at the FWA/CPE 403, and this data can be communicated to the radio path controller 610 To aid in, inter alia, CBSD selection and configuration to optimize the incipient connection between the (registering) FWA/CPE and the CBSD infrastructure.

In the circumstance where the FWA/CPE 403 may receive signals from CBSD/xNB 206, but the CPE needs to operate at signal levels higher than 23 dBm permitted by the CBRS regulations for CPE devices, the FWA/CPE registers as a CBSD operating at higher power levels.

When the FWA/CPE succeeds in its registration procedure (e.g., via the EMS 421 and DP 404), the SAS informs the FWA/CPE that it has successfully completed registration via e.g., the alternate channel used. Subsequently, the FWA/CPE can initiate direct requests for channel allocations, such as when a SAS-initiated withdrawal of spectrum is imminent. The SAS performs an assessment of spectrum availability and allocates the FWA/CPE a (new) frequency channel. At this point, FWA/CPE can start data transmission in the new CBRS band using available frequency channel granted by the CBSD/xNB and power levels authorized by the SAS. If the FWA/CPE cannot complete channel reallocation request/grant before the withdrawal of the existing allocation is required, it can again utilize the alternate or side-channel approach as needed. To this end, the controller 610 or other entity may identify the FWA/CPE 403 that must operate in high-power mode as "at risk" or the like; and utilize any data it may have regarding impending spectrum withdraws or revocations in a preemptive manner so as to avoid stranding the at-risk CPE (i.e., forcing them into use of the alternate channel approach since they are known to have to operate at high power in order to communicate with the closest/best CBSD(s)). For instance, in one variant, the at-risk CPE are given higher priority than non-at-risk CPE regarding new spectrum allocations.

As can be appreciated, there may be a significant number of different FWA/CPE 403 within the coverage areas of the CBSD/xNBs associated with a given network controller/ schedule 610. Each FWA/CPE installation may have markedly different path dynamics and RF signal propagation associated with it, and as such the exemplary embodiment of the network architecture of FIG. 6 utilizes individualized reporting for each of the different FWA/CPE devices. Accordingly, each different FWA/CPE may utilize a different combination of alternate channels, fail-over logic (i.e., when alternate channel connectivity is invoked), etc., as well as different time slot scheduling for communications with the various CBSDs.

Methods—

Figure 7:
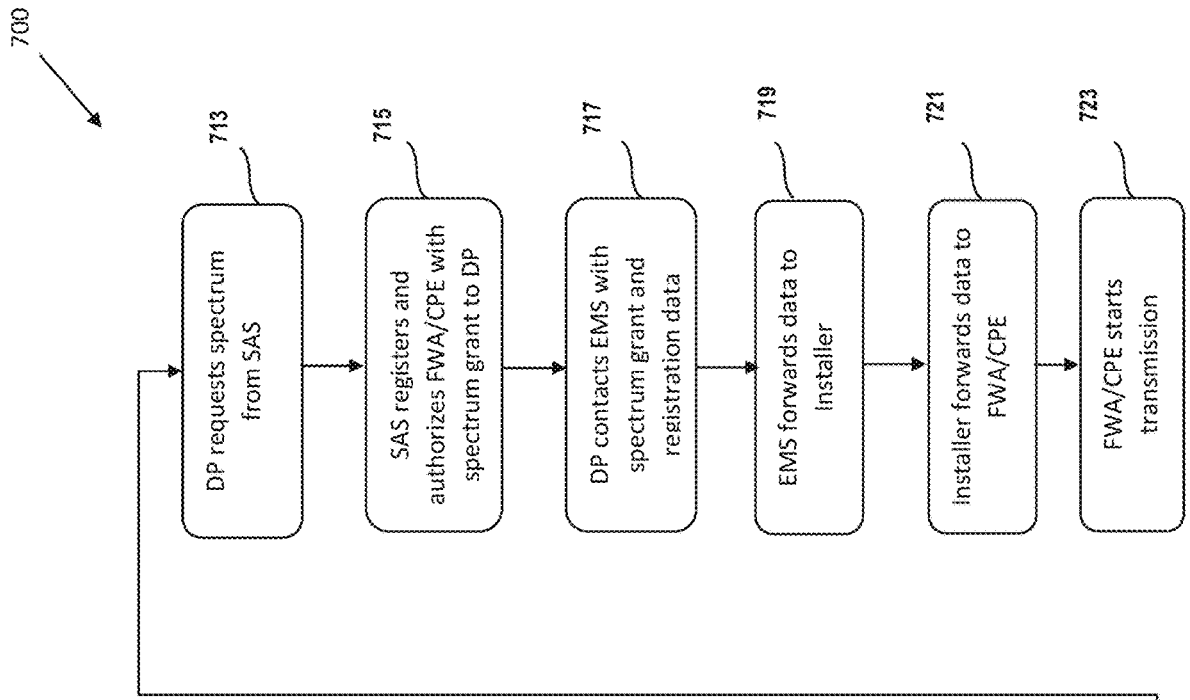
FIG. 7 is logical flow diagram of the first exemplary embodiment of a method for registering and authenticating a FWA/CPE with a SAS, according to the present disclosure.
Figure 7:
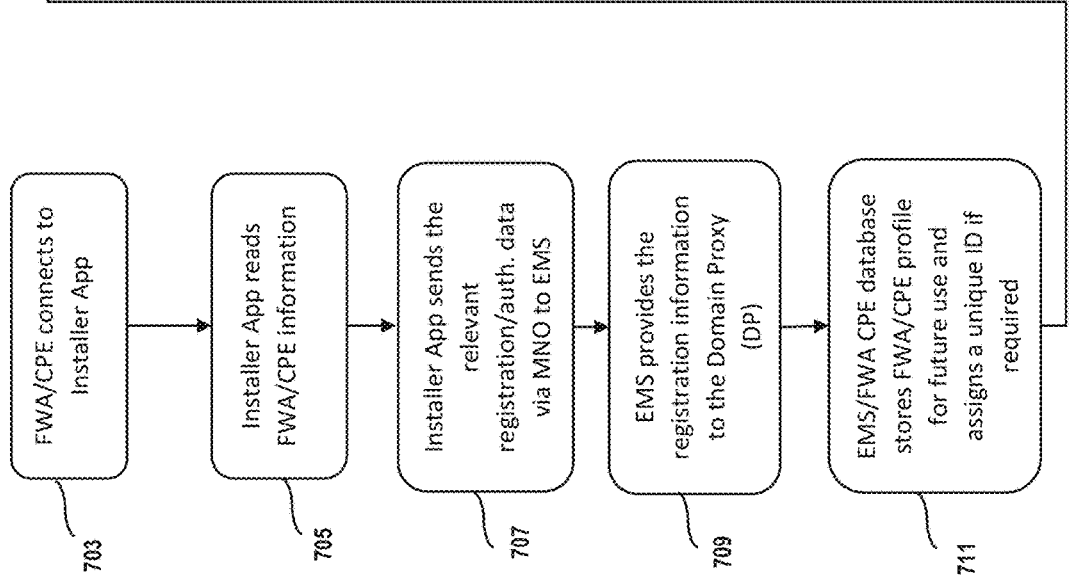

Referring now to FIG. 7, one embodiment of the general methodology 700 of providing the initial registration for the high power devices (such as e.g., CBRS FWA/CPEs) according to the present disclosure is shown and described, in the exemplary context of a CBRS-based system with SAS, CBSD/xNBs 206, EMS 421 and database 417, network controllers 610 and FWA/CPE 403 as previously described.

At step 703 of the method 700, the FWA/CPE connects to the Installer application running on the UE 466. The Installer application reads or otherwise obtains the necessary CPE information at step 705.

Per step 707, the application sends the obtained registration and authentication and other requisite data for the FWA/CPE via the MNO network to the EMS 421.

Per step 709, the EMS provide the registration information to the domain proxy (DP) 404.

At step 711, EMS and FWA CPE database 417 stores FWA/CPE profile data for the CPE 403 for future use, and assigns a unique ID to the FWA/CPE if required (e.g., if the device 403 has not yet been provisioned with an ID).

Per step 713, the DP formats and sends one or more messages to the cognizant SAS, including a request for spectrum allocation.

Per step 715, the SAS registers and authorizes the FWA/ CPE, including a spectrum grant if available.

Per step 717, the DP receives the registration data/grant and forwards it to the EMS 421.

Per step 719, the EMS forwards the received registration/ grant data to the Installer app (e.g., via the alternate channel).

Per step 721, the Installer app forwards the received data to the FWA/CPE 403 via e.g., WLAN or PAN or LAN interface between the devices.

Lastly, at step, 721, the FWA/CPE starts transmitting data and control information to the CBSD/xNB 206 according to e.g., 3GPP protocols in order to establish a data session in support of user-plane communications.

If the FWA/CPE subsequently disconnects from the network and decides to re-connect, the re-registration process similar to that as described in FIG. 7 may be used, or alternative approaches such as those described elsewhere herein (e.g., burst mode attempts at direct registration, reduced power attempts, etc.) may be used as applicable.

Figure 8:
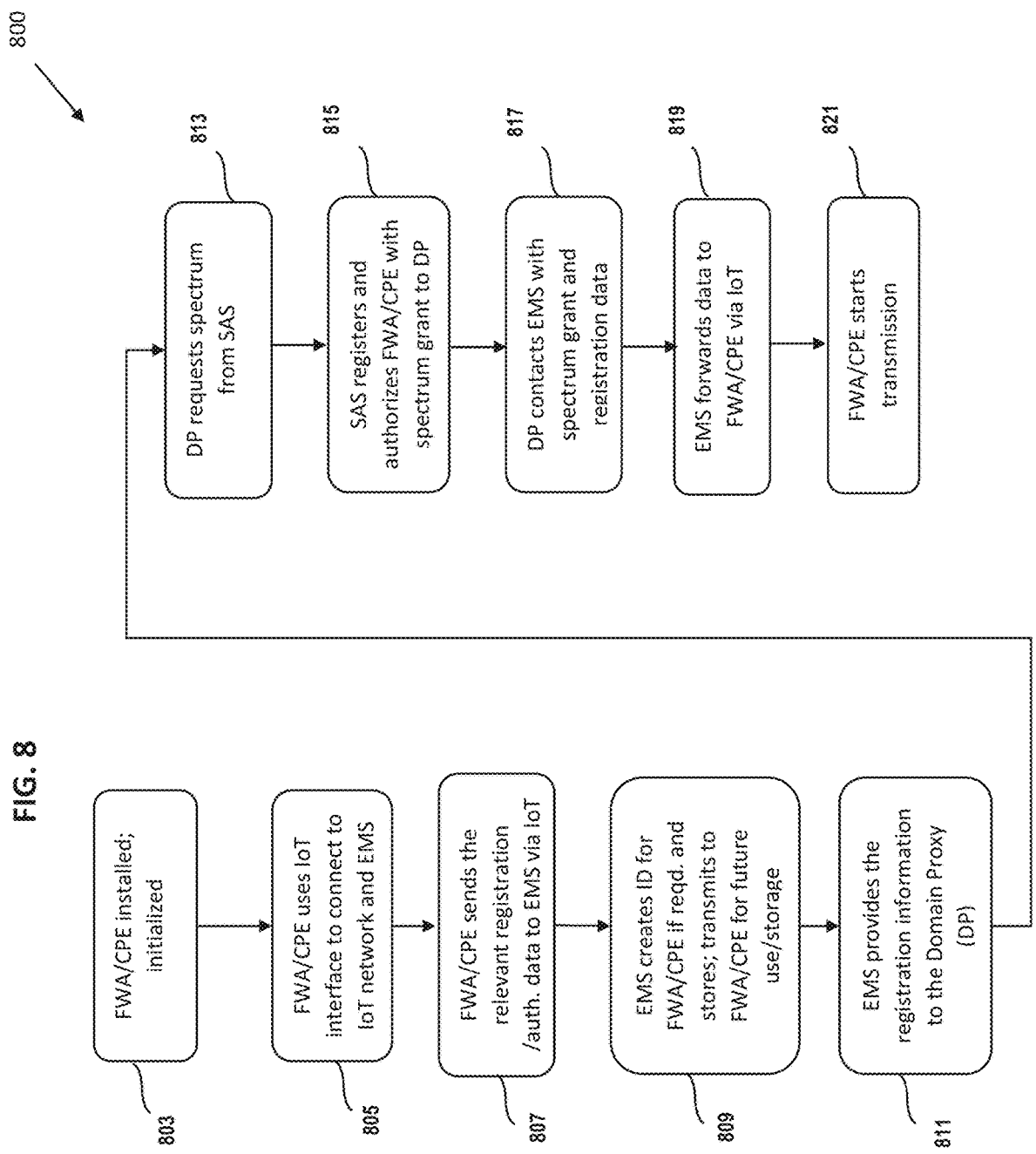
FIG. 8 is logical flow diagram of the second exemplary embodiment of a method for registering and authenticating a FWA/CPE with a SAS, according to the present disclosure.

FIG. 8 illustrates another embodiment of the method for registrations/authentication according to the disclosure.

At step 803 of the method 800, the FWA/CPE is initialized. In one variant, the EMS and FWA/CPE database 417 have assigned a pre-established unique ID to the FWA/CPE, and the FWA/CPE 403 is provisioned with the ID and initialized. In another variant, the CPE has no initial ID assigned, and is initialized "bare."

Per step 805, the FWA/CPE uses its indigenous IoT interface (see FIGS. 4B and 10B) to connect to the EMS 421 of the MSO network via an IoT network 439 (e.g. LoRa/ NB-IoT/SigFox).

Per step 807, the FWA/CPE sends the relevant data needed for registration and authentication to the EMS. In one variant, since the bandwidth is very low and latency is high on the IoT network infrastructure, only the unique ID is sent over the IoT network, and the FWA/CPE full profile is retrieved from the FWA/CPE database 417 by the EMS 421. It will be appreciated, however, that other approaches may be used; e.g., where the CPE 403 has no extant record in the DB 417, the data sent initially by the device to EMS may include a more complete set of data, up to and including a complete set needed for the requisite registration/authentication functions.

At step 809, an ID is created for the CPE 403 if needed by the EMS and stored in the DB 417; the EMS then transmits the ID data back to the FWA/CPE 403 which stores it for future reference.

At step 811, the EMS then transmits the necessary data to the DP 404.

Per step 813, the DP formats and sends one or more messages to the cognizant SAS, including a request for spectrum allocation.

Per step 815, the SAS registers and authorizes the FWA/ CPE, including a spectrum grant if available.

Per step 817, the DP receives the registration data/grant and forwards it to the EMS 421.

Per step 819, the EMS forwards the received registration/ grant data to the FWA/CPE 403 via e.g., the logical channel created over the IoT network 439 between the devices.

Lastly, at step, 821, the FWA/CPE starts transmitting data and control information to the CBSD/xNB 206 according to e.g., 3GPP protocols in order to establish a data session in support of user-plane communications.

Figure 9A:
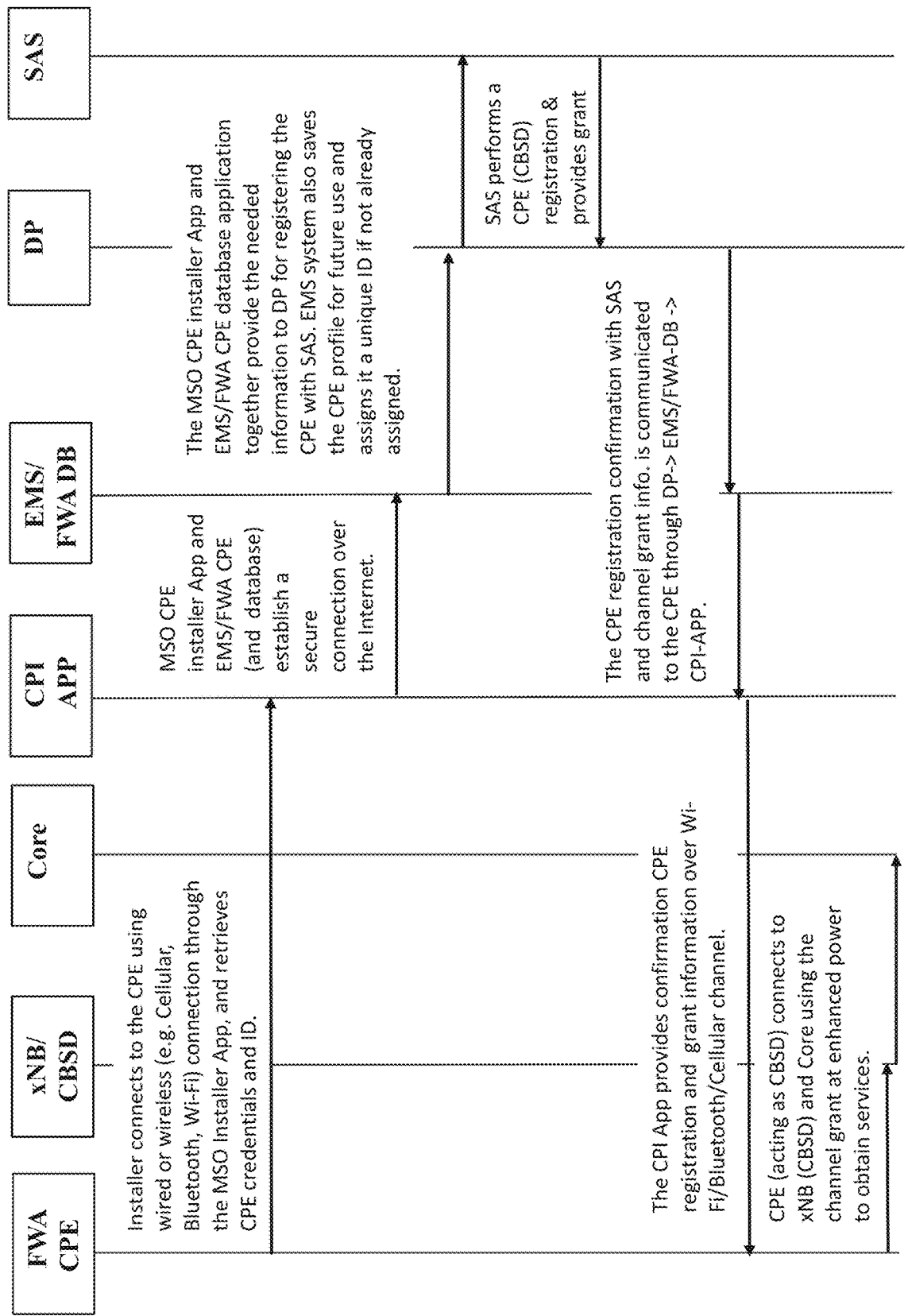
FIG. 9A is a ladder diagram illustrating a first embodiment of the registration and authentication protocol of an FWA/CPE with a SAS (using an intermediary mobile device) according to the disclosure.

FIG. 9A is a ladder diagram illustrating a first embodiment of the registration and authentication protocol of an FWA/CPE with a SAS (using an intermediary mobile device equipped with Installer application program) according to the disclosure.

Figure 9B:
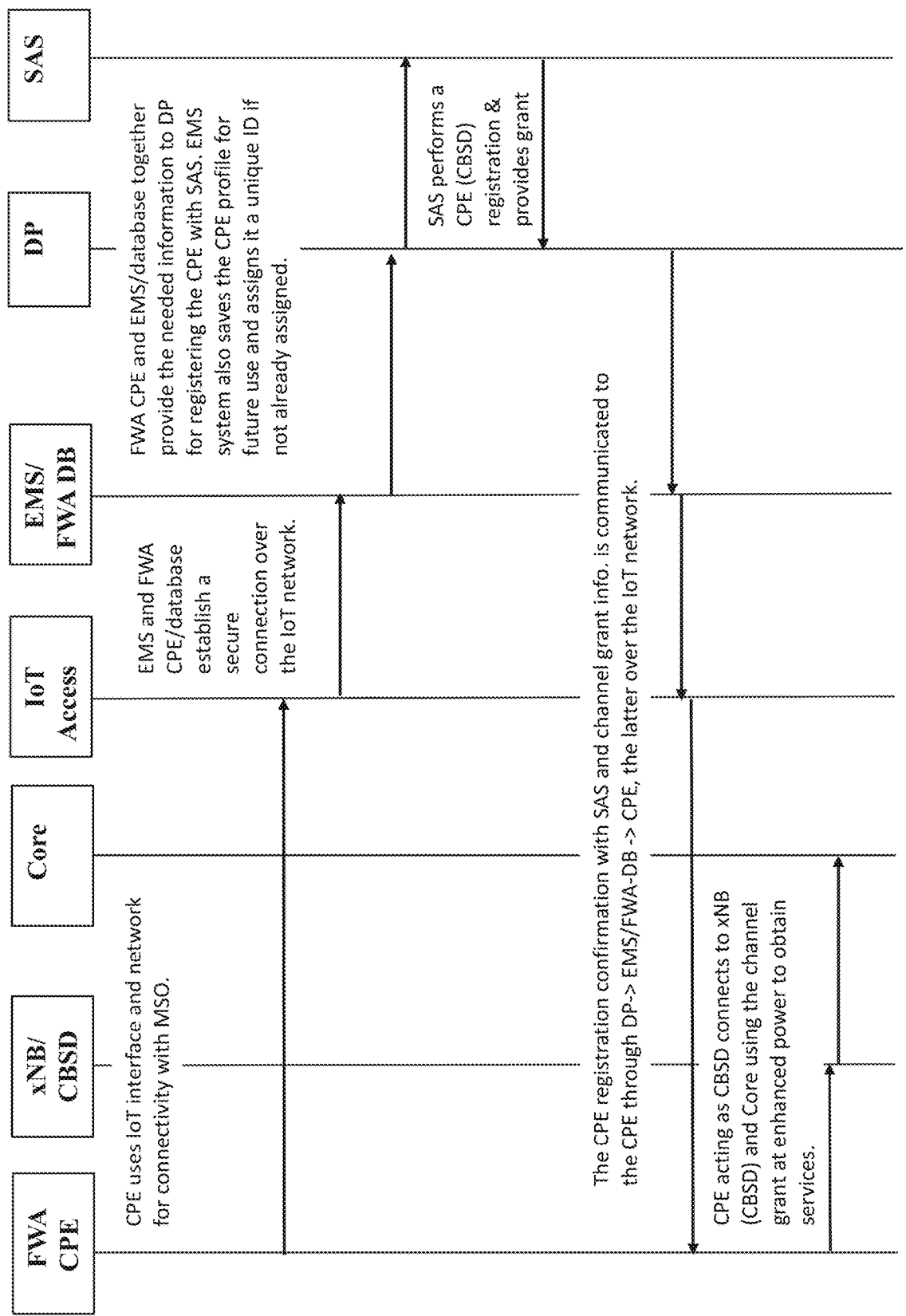
FIG. 9B is a ladder diagram illustrating a second embodiment of the registration and authentication protocol of an FWA/CPE with a SAS (using a CPE wireless or wireline interface) according to the disclosure.

FIG. 9B is a ladder diagram illustrating a second embodiment of the registration and authentication protocol of an FWA/CPE with a SAS (using a CPE-based IoT wireless interface) according to the disclosure.

Figure 9C:
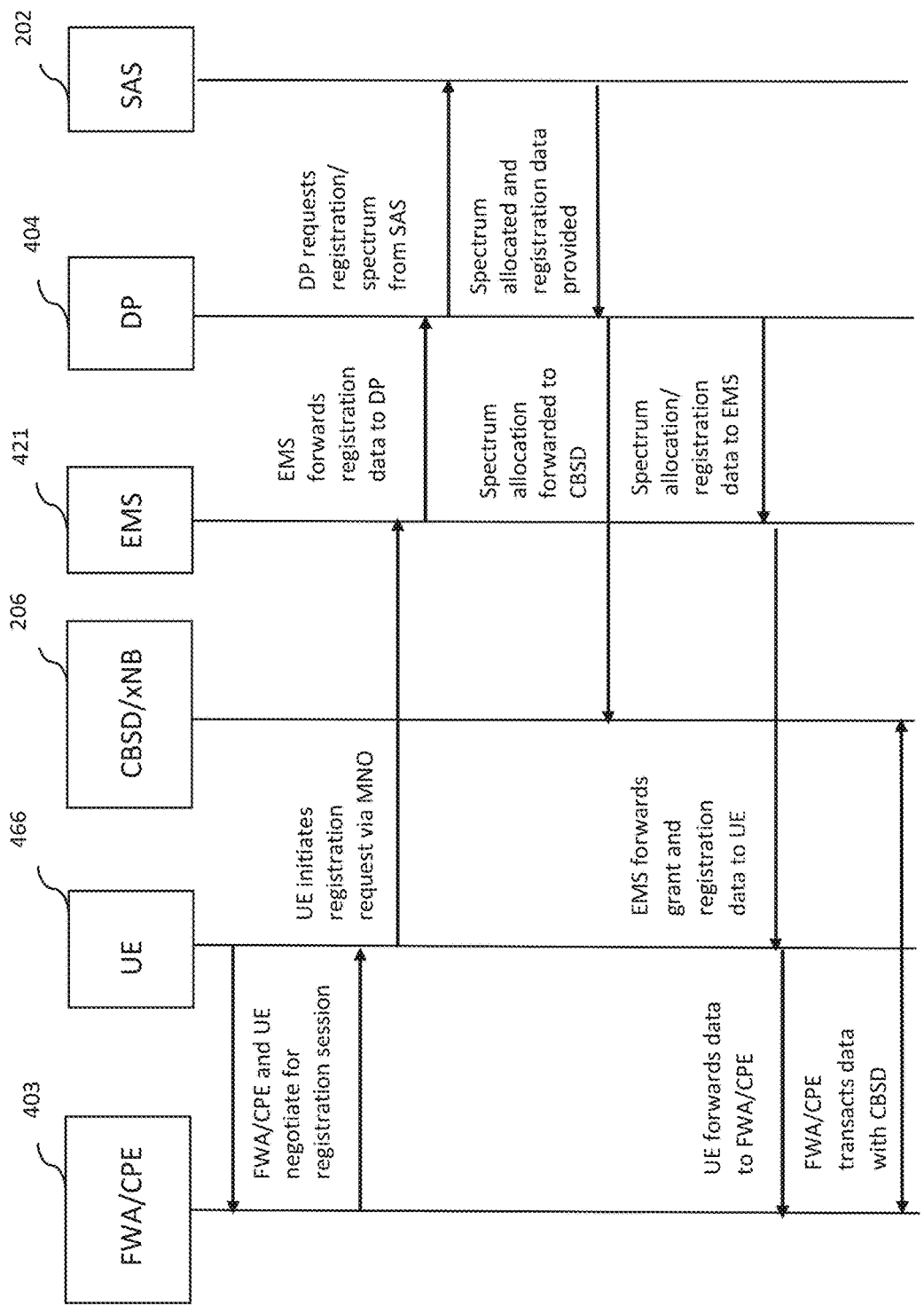
FIG. 9C is a ladder diagram illustrating yet another embodiment of the registration and authentication protocol of an FWA/CPE with a SAS according to the disclosure.

FIG. 9C is a ladder diagram illustrating another exemplary embodiment of an initial registration and authentication protocol for a high power FWA/CPE within a CBRS wireless network in accordance with the method of FIG. 7 (i.e., UE-based alternate channel approach wherein the UE receives and transmits a full data set).

It will also be appreciated that while the methods of FIGS. 7 and 8 illustrate proceeding directly to utilization of an alternate or "side" communication channel for registration/ authentication (i.e., presuming that the FWA/CPE 403 will transmit at above 23 dbm), such methods may also be adapted to implement alternate logic in this regard such as where for example the Installer app or FWA/CPE itself determines whether such alternate channel is required. For example, if other installations in the area only have required less than 23 dbm (or some other prescribed power level) historically to establish sufficient communication with a serving CBSD for purposes of registration (as contrasted with normal full bandwidth operation), then the FWA/CPE may be configured to first attempt to establish physical channel communication (e.g., "RACH") with the CBSD to see if the alternate channel approach can be obviated. If unsuccessful, then the logic may fail over to the secondary or alternate channel approaches described herein. Similarly, the FWA/CPE logic may be configured to utilize data regarding known CBSD placements or locations to "beam steer" its MIMO array (if included) towards each of the known CBSD locations successively in order to ostensibly obtain better signal utilization/path loss with respect to the various CBSDs to attempt a registration/authentication at below 23 dbm.

This logic may also be controlled by the Installer app on the UE 566 (FIG. 4A configuration); e.g., after installation of the FWA/CPE device 403, the MSO installer may instruct the device to first attempt normal registration using one or more of the above approaches before resorting to alternate channel connectivity.

FWA/CPE Apparatus—

Figure 10A:
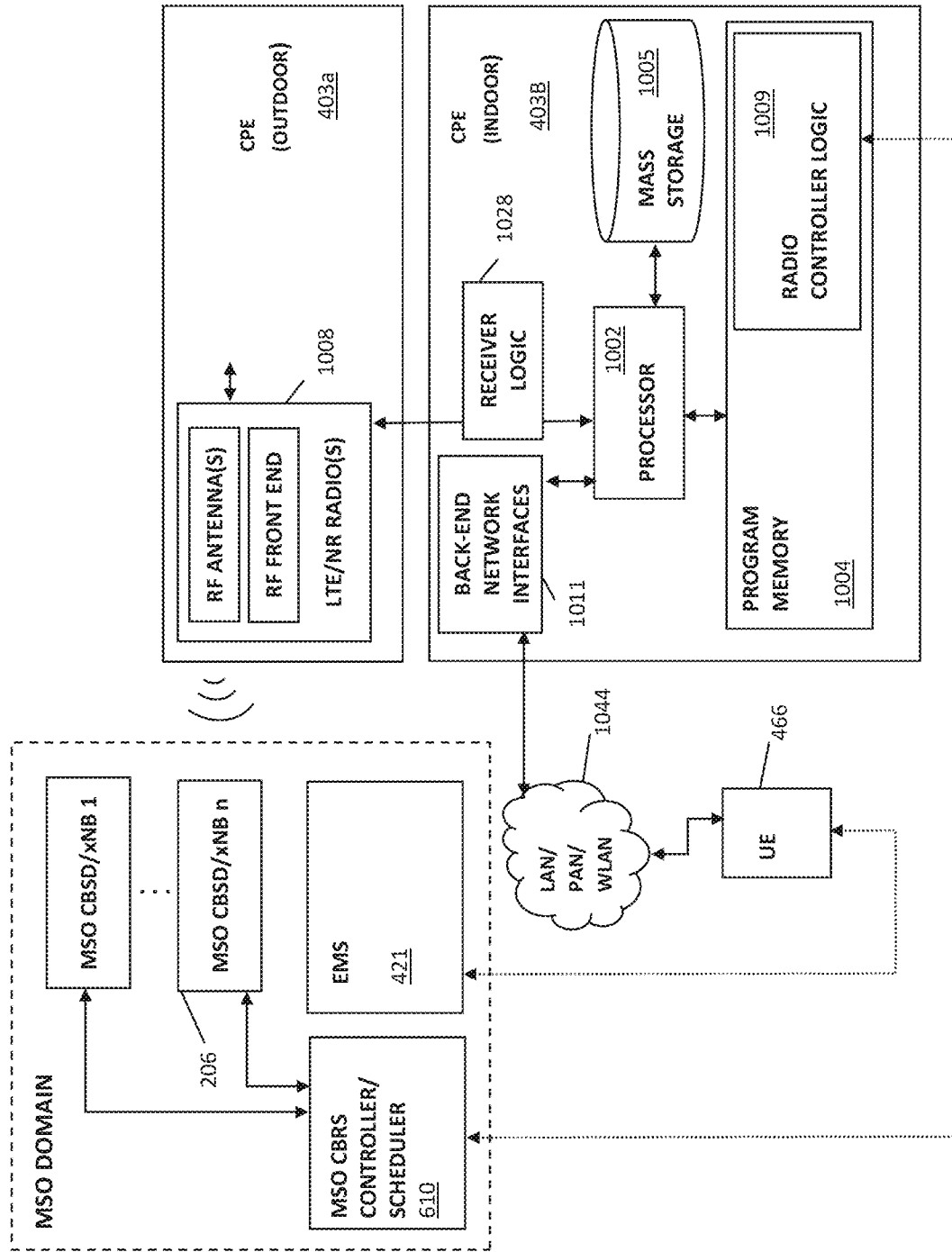
FIG. 10A is a functional block diagram illustrating one embodiment of an exemplary Consumer Premises Equipment (CPE) according to the present disclosure.
Figure 10B:
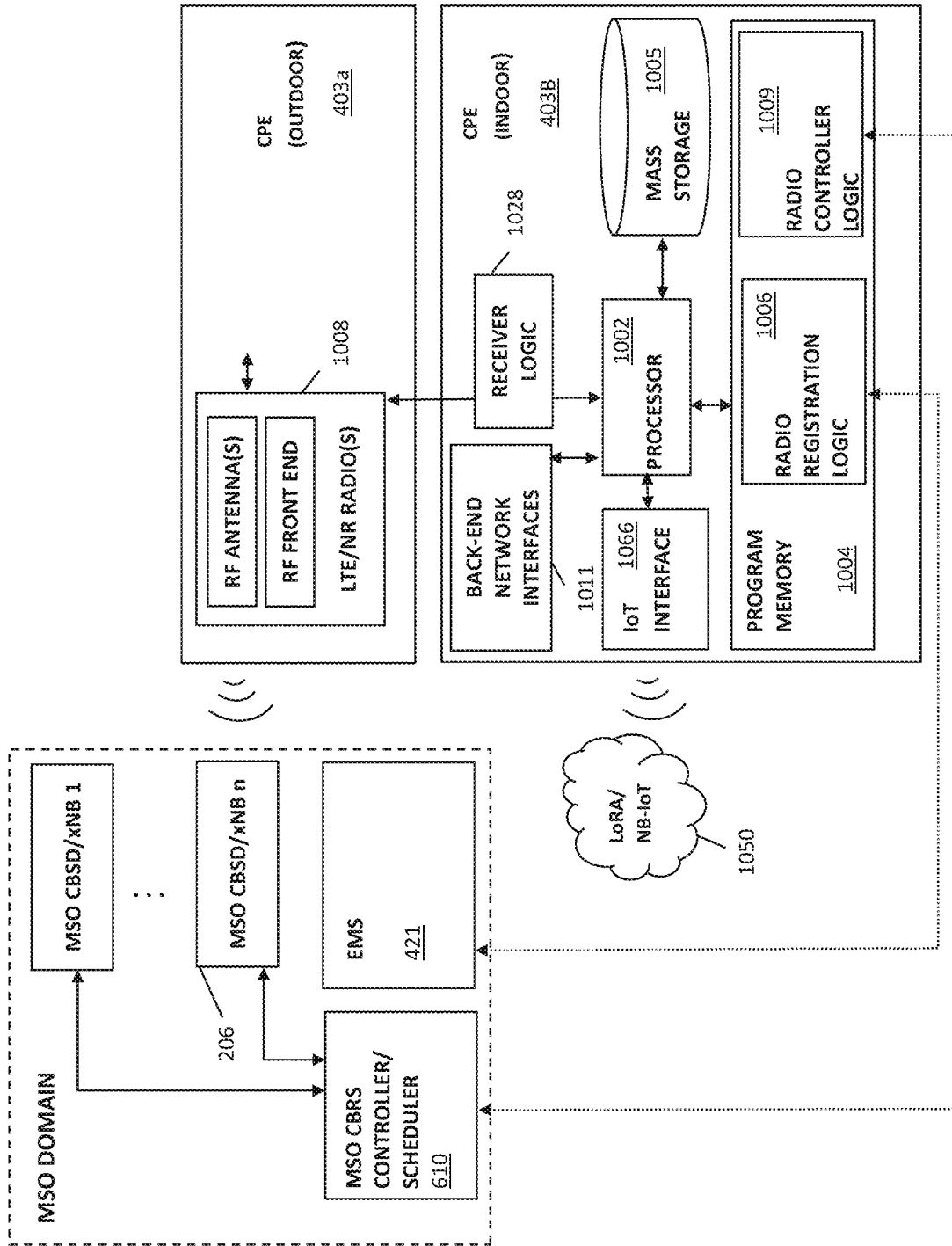
FIG. 10B is a functional block diagram illustrating a second embodiment of an exemplary Consumer Premises Equipment (CPE) according to the present disclosure.

FIGS. 10A and 10B illustrate exemplary embodiments of CPE 324 (e.g., high-power FWA or other device) configured according to the present disclosure. It will be appreciated that while described in the context of a CBRS-compliant FWA, the device of FIG. 10 may be readily adapted to other spectra and/or technologies such as e.g., Multefire, DSA, LSA, or TVWS.

As shown in FIG. 10A, the FWA/CPE 403 includes, inter alia, a processor apparatus or subsystem 1002, a program memory module 1004, mass storage 1005, CPE controller logic module 1006, one or more front end wireless network interfaces 1008 for communication with e.g., CBSD/xNB, DP (if any), the MSO controller 610 and LAN, as well as one or more back end interfaces 1011 such as for establishment of a WLAN AP within the served premises, Gigabit Ethernet or other LAN connectivity, support of home or premises gateways, DSTBs, etc. as well as for communication with a UE 566 for FWA/CPE registration and/or authentication as described elsewhere herein.

At a high level, the exemplary configuration of the FWA/CPE 403 may include two (2) sub-elements; i.e., an outdoor portion or radio head 403a, and an indoor or processing portion 403b (as shown in FIGS. 10A and 10B). The radio head 403a in the exemplary embodiment may include each of the MIMO, MISO or other spatial diversity antenna elements, as well as RF front end components necessary for receipt and processing of the signals, including logic to determine radio path parameters of interest such as amplitude/RSSI, phase, timing, as well as receive beam forming logic (e.g., to form two or more discrete receive beams for among other things, spatial or azimuthal resolution of the signals received from the various CBSD/xNBs 206 in range of the FWA/CPE 403). As such, the radio controller logic 1006 (or the beam forming logic) may "steer" the antenna array elements to evaluate or analyze particular azimuth values (which may be precoded into the logic, or fed from the network controller 610 dynamically) to scan and acquire RF signals of interest from the various CBSD/xNBs.

As indicated by its name, the CPE outdoor module or radio head 403a is typically disposed on a premises structure (e.g., rooftop, tower, utility pole, etc.) outdoors so as to minimize intervening interfering structures and RF signal attenuation as much as possible. The indoor unit 403b is in communication with the outdoor unit via e.g., interposed coaxial cable or other medium, and includes a CPE receiver unit 1028 responsible for detecting and demodulating the received RF signals from different paths and combining them into one logical data stream (and converting to an appropriate protocol for distribution within the premises such as IEEE Std. 802.3 Ethernet packets). Combination of the received constituent signals (e.g., user data accessed via the assigned TDD slots and carrier(s) and beams) is accomplished in one embodiment via stream, CBSD/xNB and beam ID data (i.e., each stream of data from the different beam from a different contributing CBSD/xNB 206 will have unique ID data that can be used to temporally reconstruct the packet data associated with that stream in proper order and relation).

In the exemplary embodiment, the processor 1002 may include one or more of a digital signal processor, microprocessor, field-programmable gate array, GPU, or plurality of processing components mounted on one or more substrates. The processor 1002 may also comprise an internal cache memory, and is in communication with a memory subsystem 1004, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 1002.

The processor 1002 is configured to execute at least one computer program stored in memory 1004 (e.g., a non-transitory computer readable storage medium); in the illustrated embodiment, such programs include logic to implement the registration/authentication and radio controller functionality described previously herein. Other embodiments may implement such functionality within dedicated hardware, logic, and/or specialized co-processors (not shown).

In the embodiment of FIG. 10B, an IOT/Bluetooth interface 1066 is integrated in the FWA/CPE device to connect to an IoT network for initial registration and authentication. The embodiment of FIG. 10B also includes more comprehensive radio registration logic 1006 to enable, inter alia, direct session establishment with the EMS 421 by the FWA/CPE 403 (versus via an intermediary device such as the UE with Installer app as in FIG. 10A).

The software stack of the FWA/CPE 403 is also optionally implemented such that CBSD/xNB-to-EMS communication protocols are used to enable the RF detection and reporting functionality previously described, including CPE functions such as (i) generation and transmission of periodic, on-demand or ad hoc RF detection reports; (ii) receipt of network controller-generated TDD slot, carrier, and CBSD/xNB and wireless beam assignments. The logic 1006 of the stack may also manage other aspects of FWA/CPE operation, including "intelligent" monitoring and storage of data for use in e.g., historical characterizations of the various CBSD/xNB in radio range of the FWA/CPE in terms of signal strength, signal identity, required signal levels for communication therewith, and other useful data.

EMS Apparatus—

Figure 11:
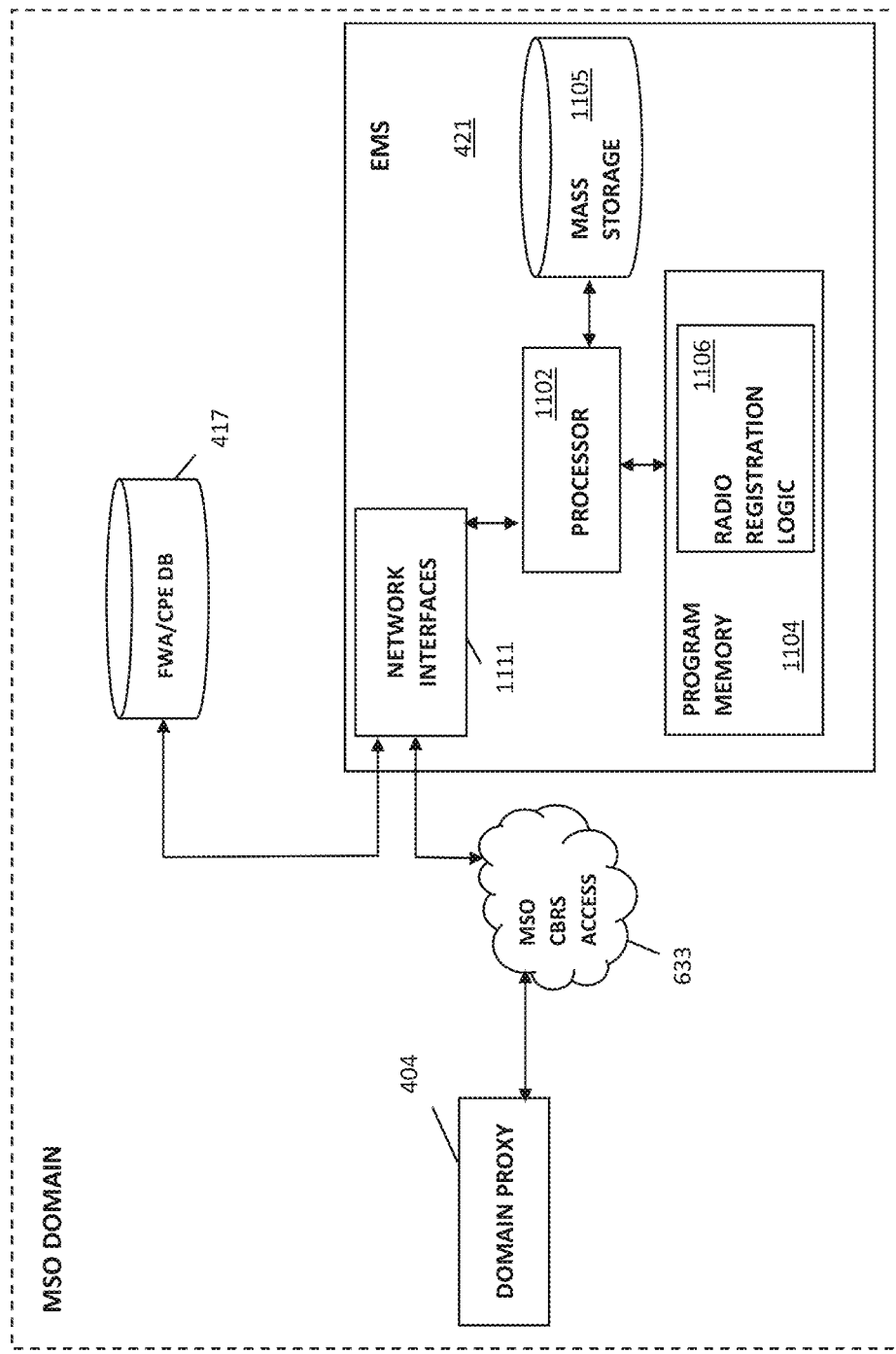
FIG. 11 is a functional block diagram illustrating one embodiment of an EMS apparatus according to the present disclosure.

FIG. 11 illustrates an exemplary embodiment of an EMS (element management system) apparatus 421 configured according to the present disclosure.

As shown in FIG. 11, the EMS 421 includes, inter alia, a processor apparatus or subsystem 1102, a program memory module 1104, mass storage 1105, radio registration logic module 1106, one or more back end interfaces 1111 such as for connection to a LAN or WAN (including Gigabit Ethernet or other LAN connectivity) for connection to the MSO DP 404 (or an external DP, not shown), as well as for communication with the FWA/CPE registration and/or authentication database 417 as shown.

In the exemplary embodiment, the processor 1102 may include one or more of a digital signal processor, microprocessor, GPU, field-programmable gate array, or plurality of processing components mounted on one or more substrates. The processor 1102 may also comprise one or more internal cache memories (e.g., L1/L2), and is in communication with a memory subsystem 1104, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 1102.

The processor 1102 is configured to execute at least one computer program stored in memory 1104 (e.g., a non-transitory computer readable storage medium); in the illustrated embodiment, such programs include logic to implement the registration and authentication functionality described previously herein. Other embodiments may implement such functionality within dedicated hardware, logic, and/or specialized co-processors (not shown).

The software stack of the EMS 421 is implemented and controlled via the registration/authentication (logic) 1106 such that Installer app (UE) 566 to EMS (or FWA/CPE to EMS) communication protocols are used to enable the functionality previously described, including functions such as (i) receipt of registration and authentication data relating to a given FWA/CPE, whether from the Installer app or the FWA/CPE itself (or other entity); (ii) establishment of a secure channel (e.g., VPN tunnel or SSL or other approach) between the Installer app (or FWA/CPE registration process 1006) and the EMS 421; (iii) storage of relevant FWA/CPE registration and authentication data (see e.g., Table 4), as well as device profile data (e.g., MAC, IP address, etc.) within the FWA/CPE DB 417; (iv) establishment of a communication channel with the MSO DP 404 (or alternatively an external or third-party DP) for transmission of registration/authentication data and spectrum requests thereto; (v) receipt of registration and spectrum grant information from the DP 404 once the cognizant SAS responds; (vi) transmission of the spectrum grant/registration information to the Installer app or FWA/CPE directly; and (vii) transmission of spectrum grant data to the cognizant CBSD(s) with which the FWA/CPE will communicate upon transmission within the allocated spectrum. The logic 1106 may also manage other aspects of FWA/CPE operation, including "intelligent" monitoring and storage of data for use in e.g., historical characterizations of the various CBSD/xNB in radio range of the FWA/CPE in terms of signal strength, signal identity (as described in detail in Table 4), common transmit power levels used by the FWA/CPE to establish communication with various CBSDs (e.g., whether greater than 23 dbm or below), and the like.

DP Apparatus—

Figure 12:
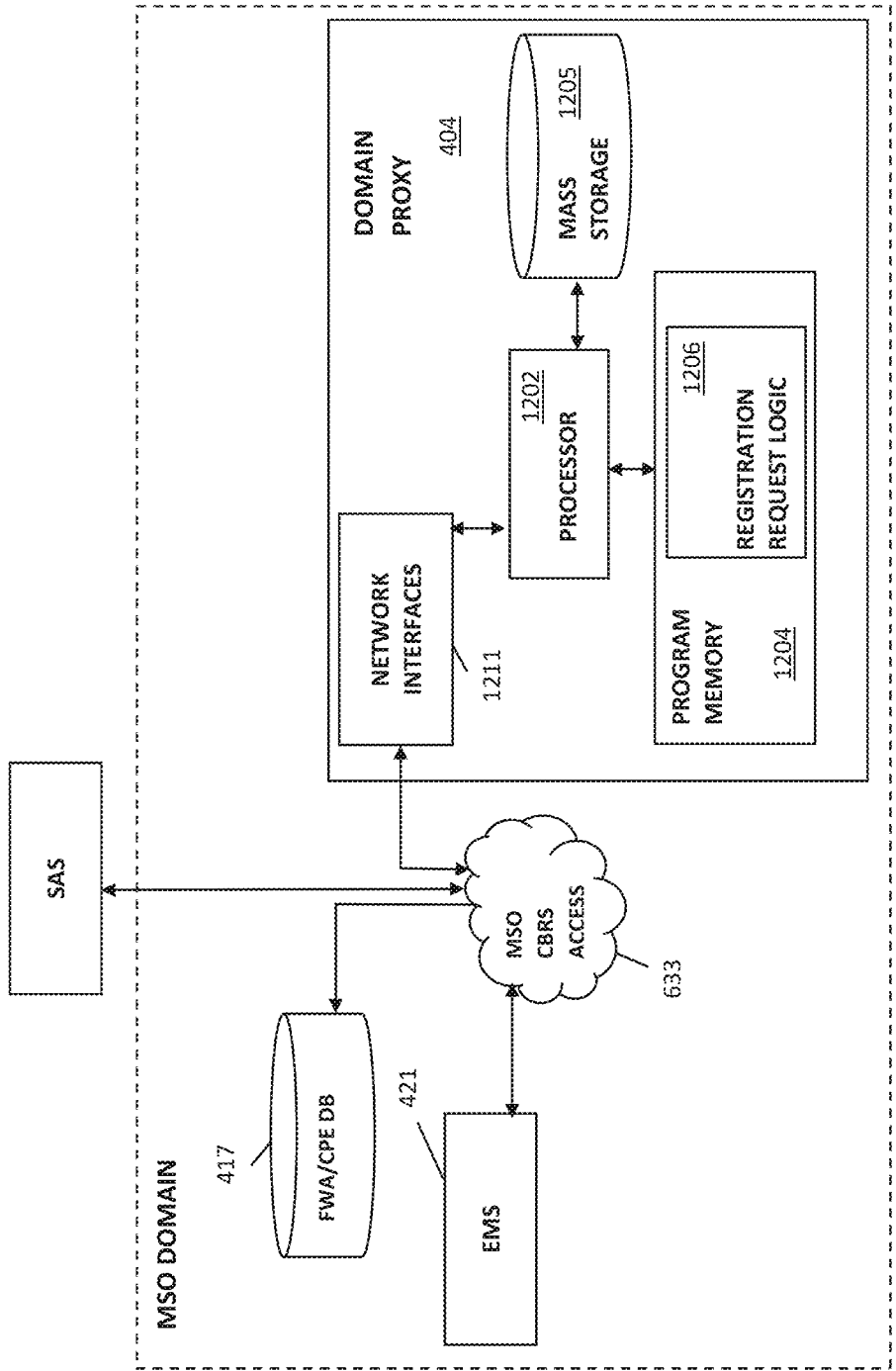
FIG. 12 is a functional block diagram illustrating one embodiment of a Domain Proxy (DP) apparatus according to the present disclosure.

FIG. 12 illustrates an exemplary embodiment of a Domain Proxy apparatus 404 configured according to the present disclosure. It will be appreciated that while described in the context of a CBRS-compliant DP, the device of FIG. 12 may be readily adapted to other components used in other technologies such as e.g., Multefire, DSA, LSA, or TVWS which fulfill similar functionality therein as the DP of CBRS (e.g., spectrum allocation or registration requests).

As shown in FIG. 12, the DP 404 includes, inter alia, a processor apparatus or subsystem 1202, a program memory module 1204, mass storage 1205, registration request logic module 1206, one or more back end interfaces 1211 such as for connection to a LAN or WAN 610 (including Gigabit Ethernet or other LAN connectivity) for connection to one or more SAS 202, as well as for communication with the EMS 421 (FIG. 11) and the FWA/CPE registration and/or authentication database 417 as shown.

In the exemplary embodiment, the processor 1202 may include one or more of a digital signal processor, microprocessor, GPU, field-programmable gate array, or plurality of processing components mounted on one or more substrates. The processor 1202 may also comprise one or more internal cache memories (e.g., L1/L2), and is in communication with a memory subsystem 1204, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 1202.

The processor 1202 is configured to execute at least one computer program stored in memory 1204 (e.g., a non-transitory computer readable storage medium); in the illustrated embodiment, such programs include logic to implement the registration and authentication functionality described previously herein. Other embodiments may implement such functionality within dedicated hardware, logic, and/or specialized co-processors (not shown).

Figure 3:
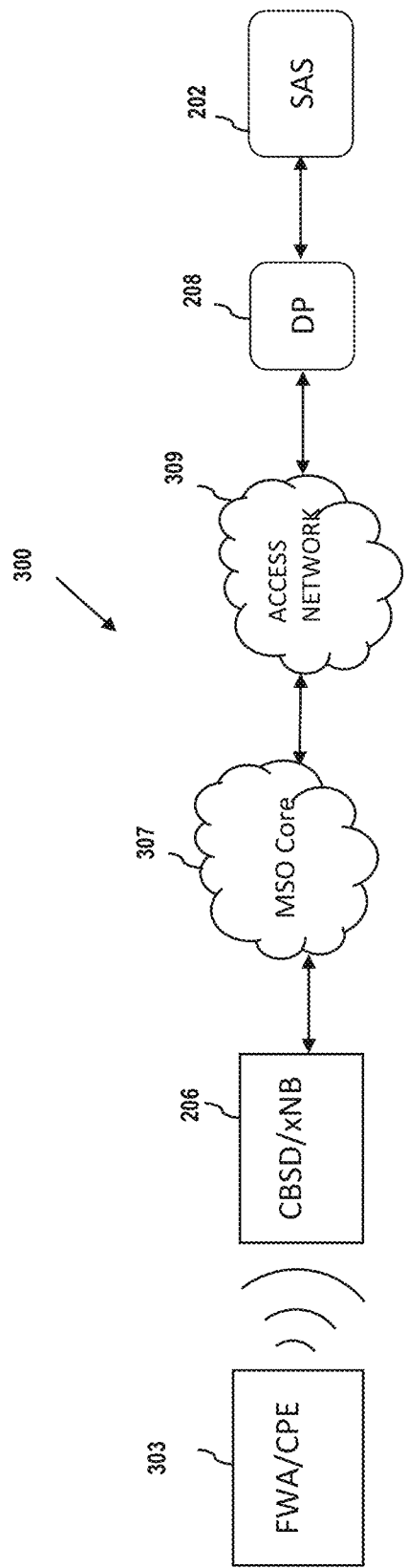
FIG. 3 is a block diagram illustrating a prior art CBRS CBSD registration and backhaul architecture.

The software stack of the DP 404 is implemented and controlled via the registration/authentication request logic 1106 such that EMS/DP communication protocols are used to enable the functionality previously described, including functions such as (i) receipt of registration and authentication data relating to a given FWA/CPE from the EMS 421; (ii) establishment of a secure channel (e.g., VPN tunnel or SSL or other approach) between the DP and the EMS 421 if required; (iii) establishment of a secure channel (e.g., VPN tunnel or SSL or other approach) between the DP and the SAS 202 if required; (iv) utilization of relevant FWA/CPE registration and authentication data (see e.g., Table 4), as well as device profile data (e.g., MAC, IP address, etc.) within the FWA/CPE DB 417 in order to generate "standard" or typically formatted registration and spectrum grant requests to the SAS (e.g., as if the FWA/CPE 403 was utilizing normal registration/grant procedures as in FIG. 3); (v) establishment of a communication channel with the MSO EMS 421 for transmission of registration/grant data based on data received from the SAS in response to the registration/spectrum requests.

In one exemplary implementation of the DP, standard DP functionality (i.e., WinnForum specified standard CBRS functionality) is used to aggregate the message exchanges between CBSDs and SAS servers (as assisted by the EMS FWA-CPE function and database described above). This approach advantageously allows for utilization within the MSO network of effectively "COTS" DP functionality, with the "intelligence" of the system for high-power FWA/CPE registration and authentication residing within the inventive EMS FWA-CPE database function (the latter which uses the small amount of data exchanged the FWA CPE over access technologies such as LoRa and NB-IoT as previously described) and uses information provisioned with in itself to formulate complete messages needed by the DP and SAS for requesting spectrum grants.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

APPENDIX I—LTE FREQUENCY BANDS—TS 36.101 (REL. 14 JUNE 2017)

| Band | Name | Downlink (MHz) | | | Bandwidth DL/UL (MHz) | Uplink (MHz) | | | Duplex spacing (MHz) | Equivalent UMTS band |
|---|---|---|---|---|---|---|---|---|---|---|
| | | Low | Middle EARFCN[1] | High | | Low | Middle EARFCN | High | | |
| 1 | 2100 | 2110 | 2140 | 2170 | 60 | 1920 | 1950 | 1980 | 190 | 1 |
| | | 0 | 300 | 599 | | 18000 | 18300 | 18599 | | |
| 2 | 1900 PCS | 1930 | 1960 | 1990 | 60 | 1850 | 1880 | 1910 | 80 | 2 |
| | | 600 | 900 | 1199 | | 18600 | 18900 | 19199 | | |
| 3 | 1800+ | 1805 | 1842.5 | 1880 | 75 | 1710 | 1747.5 | 1785 | 95 | 3 |
| | | 1200 | 1575 | 1949 | | 19200 | 19575 | 19949 | | |
| 4 | AWS-1 | 2110 | 2132.5 | 2155 | 45 | 1710 | 1732.5 | 1755 | 400 | 4 |
| | | 1950 | 2175 | 2399 | | 19950 | 20175 | 20399 | | |
| 5 | 850 | 869 | 881.5 | 894 | 25 | 824 | 836.5 | 849 | 45 | 5 |
| | | 2400 | 2525 | 2649 | | 20400 | 20525 | 20649 | | |
| 6 | UMTS only | 875 | 880 | 885 | 10 | 830 | 835 | 840 | 45 | 6 |
| | | 2650 | 2700 | 2749 | | 20650 | 20700 | 20749 | | |
| 7 | 2600 | 2620 | 2655 | 2690 | 70 | 2500 | 2535 | 2570 | 120 | 7 |
| | | 2750 | 3100 | 3449 | | 20750 | 21100 | 21449 | | |
| 8 | 900 GSM | 925 | 942.5 | 960 | 35 | 880 | 897.5 | 915 | 45 | 8 |
| | | 3450 | 3625 | 3799 | | 21450 | 21625 | 21799 | | |
| 9 | 1800 | 1844.9 | 1862.4 | 1879.9 | 35 | 1749.9 | 1767.4 | 1784.9 | 95 | 9 |
| | | 3800 | 3975 | 4149 | | 21800 | 21975 | 22149 | | |
| 10 | AWS-1+ | 2110 | 2140 | 2170 | 60 | 1710 | 1740 | 1770 | 400 | 10 |
| | | 4150 | 4450 | 4749 | | 22150 | 22450 | 22749 | | |
| 11 | 1500 Lower | 1475.9 | 1485.9 | 1495.9 | 20 | 1427.9 | 1437.9 | 1447.9 | 48 | 11 |
| | | 4750 | 4850 | 4949 | | 22750 | 22850 | 22949 | | |
| 12 | 700 a | 729 | 737.5 | 746 | 17 | 699 | 707.5 | 716 | 30 | 12 |
| | | 5010 | 5095 | 5179 | | 23010 | 23095 | 23179 | | |
| 13 | 700 c | 746 | 751 | 756 | 10 | 777 | 782 | 787 | −31 | 13 |
| | | 5180 | 5230 | 5279 | | 23180 | 23230 | 23279 | | |
| 14 | 700 PS | 758 | 763 | 768 | 10 | 788 | 793 | 798 | −30 | 14 |
| | | 5280 | 5330 | 5379 | | 23280 | 23330 | 23379 | | |
| 17 | 700 b | 734 | 740 | 746 | 12 | 704 | 710 | 716 | 30 | |
| | | 5730 | 5790 | 5849 | | 23730 | 23790 | 23849 | | |
| 18 | 800 Lower | 860 | 867.5 | 875 | 15 | 815 | 822.5 | 830 | 45 | |
| | | 5850 | 5925 | 5999 | | 23850 | 23925 | 23999 | | |
| 19 | 800 Upper | 875 | 882.5 | 890 | 15 | 830 | 837.5 | 845 | 45 | 19 |
| | | 6000 | 6075 | 6149 | | 24000 | 24075 | 24149 | | |
| 20 | 800 DD | 791 | 806 | 821 | 30 | 832 | 847 | 862 | −41 | 20 |
| | | 6150 | 6300 | 6449 | | 24150 | 24300 | 24449 | | |
| 21 | 1500 Upper | 1495.9 | 1503.4 | 1510.9 | 15 | 1447.9 | 1455.4 | 1462.9 | 48 | 21 |
| | | 6450 | 6525 | 6599 | | 24450 | 24525 | 24599 | | |
| 22 | 3500 | 3510 | 3550 | 3590 | 80 | 3410 | 3450 | 3490 | 100 | 22 |
| | | 6600 | 7000 | 7399 | | 24600 | 25000 | 25399 | | |
| 23 | 2000 S-band | 2180 | 2190 | 2200 | 20 | 2000 | 2010 | 2020 | 180 | |
| | | 7500 | 7600 | 7699 | | 25500 | 25600 | 25699 | | |
| 24 | 1600 L-band | 1525 | 1542 | 1559 | 34 | 1626.5 | 1643.5 | 1660.5 | −101.5 | |
| | | 7700 | 7870 | 8039 | | 25700 | 25870 | 26039 | | |
| 25 | 1900+ | 1930 | 1962.5 | 1995 | 65 | 1850 | 1882.5 | 1915 | 80 | 25 |
| | | 8040 | 8365 | 8689 | | 26040 | 26365 | 26689 | | |
| 26 | 850+ | 859 | 876.5 | 894 | 35 | 814 | 831.5 | 849 | 45 | 26 |
| | | 8690 | 8865 | 9039 | | 26690 | 26865 | 27039 | | |
| 27 | 800 SMR | 852 | 860.5 | 869 | 17 | 807 | 815.5 | 824 | 45 | |
| | | 9040 | 9125 | 9209 | | 27040 | 27125 | 27209 | | |
| 28 | 700 APT | 758 | 780.5 | 803 | 45 | 703 | 725.5 | 748 | 55 | |
| | | 9210 | 9435 | 9659 | | 27210 | 27435 | 27659 | | |
| 29 | 700 d | 717 | 722.5 | 728 | 11 | | Downlink only | | | |
| | | 9660 | 9715 | 9769 | | | | | | |
| 30 | 2300 WCS | 2350 | 2355 | 2360 | 10 | 2305 | 2310 | 2315 | 45 | |
| | | 9770 | 9820 | 9869 | | 27660 | 27710 | 27759 | | |

-continued

| Band | Name | Downlink (MHz) Low EARFCN¹ | Downlink (MHz) Middle | Downlink (MHz) High | Bandwidth DL/UL (MHz) | Uplink (MHz) Low | Uplink (MHz) Middle EARFCN | Uplink (MHz) High | Duplex spacing (MHz) | Equivalent UMTS band |
|---|---|---|---|---|---|---|---|---|---|---|
| 31 | 450 | 462.5 9870 | 465 9895 | 467.5 9919 | 5 | 452.5 27760 | 455 27785 | 457.5 27809 | 10 | |
| 32 | 1500 L-band | 1452 9920 | 1474 10140 | 1496 10359 | 44 | | Downlink only | | | 32 |
| 65 | 2100+ | 2110 65536 | 2155 65986 | 2200 66435 | 90 | 1920 131072 | 1965 131522 | 2010 131971 | 190 | |
| 66 | AWS-3 | 2110 66436 | 2155 66886 | 2200 67335 | 90/70 | 1710 131972 | 1745 132322 | 1780 132671 | 400 | |
| 67 | 700 EU | 738 67336 | 748 67436 | 758 67535 | 20 | | Downlink only | | | |
| 68 | 700 ME | 753 67536 | 768 67686 | 783 67835 | 30 | 698 132672 | 713 132822 | 728 132971 | 55 | |
| 69 | 2500 | 2570 67836 | 2595 68086 | 2620 68335 | 50 | | Downlink only | | | |
| 70 | AWS-4 | 1995 68336 | 2007.5 68461 | 2020 68585 | 25/15 | 1695 132972 | 1702.5 133047 | 1710 133121 | 300 | |
| 252 | Unlicensed NII-1 | 5150 255144 | 5200 255644 | 5250 256143 | 100 | | Downlink only | | | |
| 255 | Unlicensed NII-3 | 5725 260894 | 5787.5 261519 | 5850 262143 | 125 | | Downlink only | | | |
| TDD | | | | | | | | | | |
| 33 | TD 1900 | 1900 36000 | 1910 36100 | 1920 36199 | 20 | | | | | A(lo) |
| 34 | TD 2000 | 2010 36200 | 2017.5 36275 | 2025 36349 | 15 | | | | | A(hi) |
| 35 | TD PCS Lower | 1850 36350 | 1880 36650 | 1910 36949 | 60 | | | | | B(lo) |
| 36 | TD PCS Upper | 1930 36950 | 1960 37250 | 1990 37549 | 60 | | | | | B(hi) |
| 37 | TD PCS Center gap | 1910 37550 | 1920 37650 | 1930 37749 | 20 | | | | | C |
| 38 | TD 2600 | 2570 37750 | 2595 38000 | 2620 38249 | 50 | | | | | D |
| 39 | TD 1900+ | 1880 38250 | 1900 38450 | 1920 38649 | 40 | | | | | F |
| 40 | TD 2300 | 2300 38650 | 2350 39150 | 2400 39649 | 100 | | | | | E |
| 41 | TD 2500 | 2496 39650 | 2593 40620 | 2690 41589 | 194 | | | | | |
| 42 | TD 3500 | 3400 41590 | 3500 42590 | 3600 43589 | 200 | | | | | |
| 43 | TD 3700 | 3600 43590 | 3700 44590 | 3800 45589 | 200 | | | | | |
| 44 | TD 700 | 703 45590 | 753 46090 | 803 46589 | 100 | | | | | |
| 45 | TD 1500 | 1447 46590 | 1457 46690 | 1467 46789 | 20 | | | | | |
| 46 | TD Unlicensed | 5150 46790 | 5537.5 50665 | 5925 54539 | 775 | | | | | |
| 47 | TD V2X | 5855 54540 | 5890 54890 | 5925 55239 | 70 | | | | | |
| 48 | TD 3600 | 3550 55240 | 3625 55990 | 3700 56739 | 150 | | | | | |

¹EUTRA Absolute RF Channel Number

What is claimed is:

1. A computerized method of operating a wireless network infrastructure comprising at least one wireless-enabled device and at least one base station, the computerized method comprising:
    opportunistically utilizing a first communication channel to cause transmission of at least first data to a network entity, the first communication channel not utilizing the at least one base station and relating to the at least one wireless-enabled device disposed at a premises;
    providing to the at least one wireless-enabled device via the first communication channel at least data enabling identification of a grant of a radio frequency (RF) spectrum; and
    based at least in part of the provided at least data enabling identification of the grant of the RF spectrum, enabling communication within the granted RF spectrum between the at least one wireless-enabled device and the at least one base station.

2. The computerized method of claim 1, wherein the opportunistically utilizing the first communication channel to cause the transmission of the at least first data to the network entity, the first communication channel not utilizing the at least one base station and relating to the at least one wireless-enabled device disposed at the premises, comprises establishing an ad hoc channel via the at least one wireless-enabled device disposed at the premises.

3. The computerized method of claim 2, wherein the establishing an ad hoc channel enabled wireless device comprises establishing a channel via a LoRa (Long Range) enabled device.

4. The computerized method of claim 2, wherein the establishing an ad hoc channel enabled wireless device comprises establishing a channel via an IoT (Internet of Things)-enabled wireless device associated with the premises.

5. The computerized method of claim 1, wherein the transmission of the at least first data to the network entity comprises transmission of registration data to the network entity.

6. A computerized wireless apparatus for use with a wireless network infrastructure comprising at least one base station and a computerized network entity configured for transmitting radio frequency spectrum allocation data, the computerized wireless apparatus comprising:
  digital processor apparatus;
  a first data network interface in data communication with the digital processor apparatus;
  a second data network interface in data communication with the digital processor apparatus, wherein neither the first data network interface nor the second data network interface utilize the at least one base station; and
  a storage device in data communication with the digital processor apparatus and comprising at least one computer program configured to, when executed on the digital processor apparatus, cause the computerized wireless apparatus to:
    select one of the first data network interface or the second data network interface to utilize for transmission of data to the computerized network entity;
    transmit via the selected one of the first data network interface or the second data network interface, at least first data relating to at least one of (i) the computerized wireless apparatus, or (ii) its surrounding radio frequency (RF) environment;
    receive via at least one of the first data network interface or the second data network interface, at least second data, the received at least second data relating to an RF spectrum grant issued from an RF spectrum allocation entity; and
    enabling communication between the computerized wireless apparatus and the at least one base station using RF spectrum identified in received at least second data.

7. The computerized wireless apparatus of claim 6, wherein:
  the first data network interface comprises a short-range wireless interface configured to opportunistically establish a temporary wireless data association with a wireless-enabled mobile device when the wireless-enabled mobile device is within wireless range of the computerized wireless apparatus;
  the second data network interface comprises a long-range wireless interface configured to establish an at least temporary wireless data association with the wireless network infrastructure; and
  the data bandwidth of the first data network interface is higher than that of the second data network interface such that the first data network interface can support transmission of one or more data types which cannot be supported by the second data network interface.

8. The computerized wireless apparatus of claim 7, wherein the selection of one of the first data network interface or the second data network interface to utilize for the transmission of the data to the computerized network entity is based at least on a type of the at least first data to be transmitted to the computerized network entity.

9. The computerized wireless apparatus of claim 7, wherein:
  the at least first data comprises a unique identifier associated with the computerized wireless apparatus, the unique identifier configured to enable the computerized network entity or a proxy computerized process thereof to access, based on the unique identifier received from the computerized wireless apparatus, additional data relating to the computerized wireless apparatus, the additional data enabling generation of a spectrum request to a spectrum allocation entity, the spectrum request on behalf of the computerized wireless apparatus; and
  utilization of the unique identifier obviates transmission of the additional data over either the first data network interface or the second data network interface such that at least the second data network interface may be used to carry the unique identifier with a permissible level of transmission latency.

10. The computerized wireless apparatus of claim 6, wherein the at least first data comprises a unique identifier associated with the computerized wireless apparatus, the unique identifier configured to enable the computerized network entity or a proxy computerized process thereof to access, based on the unique identifier received from the computerized wireless apparatus, additional data relating to the computerized wireless apparatus, the additional data enabling generation of a spectrum request to a spectrum allocation entity, the spectrum request on behalf of the computerized wireless apparatus.

11. The computerized wireless apparatus of claim 6, wherein the computerized wireless apparatus initially comprises no identifier, and the at least first data comprises a request for issuance of unique identifier associated with the computerized wireless apparatus, and the received at least second data comprises a unique identifier issued by the computerized network entity or a proxy process thereof responsive to the request of the at least first data.

12. The computerized wireless apparatus of claim 6, wherein the computerized wireless apparatus comprises a fixed wireless apparatus of a managed content delivery network operated by a multiple system operator (MSO) and configured for use on a premises of a subscriber of the managed content delivery network, and the at least one computer program is configured to, when executed on the digital processor apparatus, cause the computerized wireless apparatus to perform the selection, transmission, reception, and enablement of communication pursuant to at least one of an initial installation routine or initialization routine.

13. The computerized wireless apparatus of claim 6, wherein:
  the first data network interface comprises one of a PAN (Personal Area Network) or WLAN (Wireless Local Area Network) interface; and
  the second data network interface comprises a sub-GHz band data interface configured for long-range communication relative to a range of the PAN or the WLAN.

14. A computerized method of operating a wireless transceiver within a wireless network infrastructure comprising at least one base station, the at least one base station used for provision of one or more broadband services to a plurality of wireless transceivers, and a network entity, the computerized method comprising:

receiving at least one of (i) an application programming interface (API) call, or (ii) an HTTP (Hypertext Transfer Protocol) GET request, at the wireless transceiver, the at least one of the API call or the HTTP GET request configured to elicit access of first data required by the network entity to further process a radio frequency spectrum request on behalf of the wireless transceiver;

responsive to the received at least one of the API call or the HTTP GET request, accessing the first data required by the network entity;

establishing a communication channel with the network entity, the communication channel not utilizing the at least one base station;

causing transmission of at least the accessed first data to the network entity using at least the communication channel;

receiving second data transmitted by the network entity relating to configuration of the wireless transceiver; and utilizing the received second data to configure at least a portion of the wireless transceiver to operate in conjunction with the at least one base station for the provision of the one or more broadband services to the wireless transceiver.

15. The computerized method of claim 14, wherein the receiving of the at least one of the API call or the HTTP GET request comprises:

establishing a wireless link between the wireless transceiver and a wireless-enabled mobile device within wireless range of the wireless transceiver; and receiving the at least one of the API call or the HTTP GET request issued by an application computer program operative to execute on the wireless-enabled mobile device and transmitted via the wireless link.

16. The computerized method of claim 15, wherein the establishing of the communication channel with the network entity comprises using at least (i) the established wireless link; (ii) a cellular wireless link between the wireless-enabled mobile device and a mobile network operator infrastructure; and (iii) data communication between the mobile network operator infrastructure and the network entity.

17. The computerized method of claim 15, wherein the receiving of the second data transmitted by the network entity relating to configuration of the wireless transceiver comprises receiving at least data descriptive of a spectrum grant, the data descriptive of the spectrum grant having been mapped from a first protocol utilized by a spectrum allocation entity to a second protocol utilized by the wireless transceiver.

18. A computerized method of operating a wireless transceiver within a wireless network infrastructure comprising at least one base station, the at least one base station used for provision of one or more broadband data services to a plurality of wireless transceivers, and a network entity, the wireless transceiver comprising both a first wireless network interface for use in the provision of the one or more broadband data services to the wireless transceiver, and a second wireless network interface configured to communicate with a distant receiver in support of at least one of installation or initialization of the wireless transceiver, the computerized method comprising:

initializing at least a portion of a protocol stack of the wireless transceiver;

based at least on the initializing, accessing first data required by the network entity to further process a radio frequency spectrum request on behalf of the wireless transceiver, the radio frequency spectrum request pursuant to the at least one of the installation or the initialization;

establishing a communication channel with the network entity, the communication channel not utilizing either the at least one base station or the first wireless network interface, and utilizing the second wireless network interface;

causing transmission of at least the accessed first data to the network entity using at least the communication channel and the second wireless network interface;

receiving second data transmitted by the network entity relating to configuration of the wireless transceiver; and utilizing the received second data to configure at least a portion of the wireless transceiver to operate in conjunction with the at least one base station for the provision of the one or more broadband data services to the wireless transceiver via the first wireless network interface.

19. The computerized method of claim 18, wherein the first wireless network interface comprises a 3GPP (Third Generation Partnership Project) LTE (long Term Evolution) or 5G NR (Fifth Generation New Radio) compliant wireless interface, and the second wireless network interface comprises a sub-GHz wireless interface with EIRP (Equivalent Isotropic Radiated Power) below a prescribed EIRP value associated with operation of the first wireless network interface within one or more prescribed frequency bands for the provision of the one or more broadband data services.

20. The computerized method of claim 1, wherein the wireless transceiver comprises a CBRS (citizens broadband radio service) fixed wireless access (FWA) device.

\* \* \* \* \*